United States Patent [19]
Ohta et al.

[11] Patent Number: 5,241,520
[45] Date of Patent: Aug. 31, 1993

[54] SYSTEM AND METHOD OF REPRODUCING SIGNALS RECORDED ON A MAGNETO-OPTIC RECORDING MEDIUM

[75] Inventors: Masumi Ohta, Tokyo; Katsuhisa Aratani, Chiba; Isamu Nakao, Tokyo, all of Japan

[73] Assignee: Sony Corporation, Tokyo, Japan

[21] Appl. No.: 815,330

[22] Filed: Dec. 21, 1991

[30] Foreign Application Priority Data

| | | | |
|---|---|---|---|
| Dec. 28, 1990 | [JP] | Japan | 2-418110 |
| Feb. 8, 1991 | [JP] | Japan | 3-018072 |
| Feb. 8, 1991 | [JP] | Japan | 3-018075 |

[51] Int. Cl.$^5$ .............................................. G11B 11/00
[52] U.S. Cl. ........................................ 369/13; 369/110; 360/59
[58] Field of Search ................ 369/13, 14, 110; 365/122; 360/59, 114

[56] References Cited

U.S. PATENT DOCUMENTS

| | | | |
|---|---|---|---|
| 4,932,012 | 6/1990 | Kobayashi | 369/13 |
| 5,018,119 | 5/1991 | Aratani et al. | 369/13 |
| 5,168,482 | 12/1992 | Aratani et al. | 369/13 |

FOREIGN PATENT DOCUMENTS

| | | |
|---|---|---|
| 0318925 | 6/1989 | European Pat. Off. |
| 0415449A2 | 3/1991 | European Pat. Off. |
| 415449A | 3/1991 | European Pat. Off. ............. 369/13 |
| 58-169358 | 10/1983 | Japan ................................... 369/13 |
| 2-96926 | 5/1990 | Japan. |
| 2157876 | 10/1985 | United Kingdom ................... 369/13 |

OTHER PUBLICATIONS

*JEE Journal of Electronic Engineering*, May 28, 1991, No. 293, "Unique MO Disk Attains Super Resolution", by Katsuhisa Aratani et al, pp. 74-76.

*Primary Examiner*—Robert J. Pascal
*Assistant Examiner*—Tan Dinh
*Attorney, Agent, or Firm*—Hill, Steadman & Simpson

[57] ABSTRACT

A magneto-optical recording medium has a multi-layer magnetic film structure comprising a reproducing layer, an intermediate layer, and a record holding layer. These layers are magnetically coupled to one another. The recording medium is irradiated with a laser beam and appropriate magnetic fields are provided such that in a area of a spot of the laser beam on the recording medium, first, second and third regions are formed as a result of the temperature distribution within the laser beam spot. The first and third regions act as masking regions, with the second region between the first and third regions being a region from which magnetic signals stored in the record hold layer are transferred to the reproducing layer and are read out from the reproducing layer.

28 Claims, 23 Drawing Sheets

F I G. 4
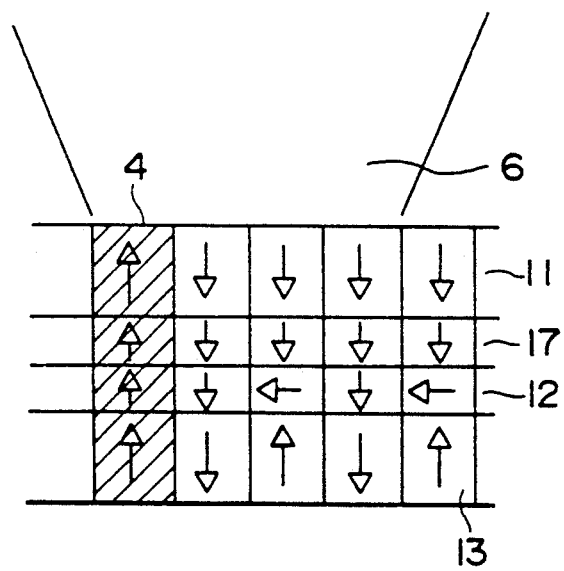

F I G. 19
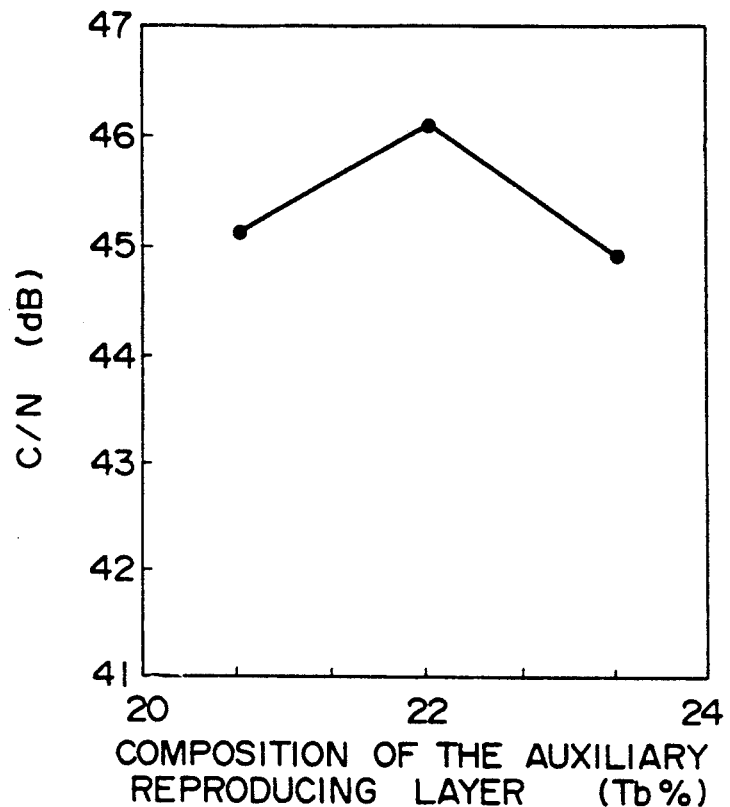
F I G. 20
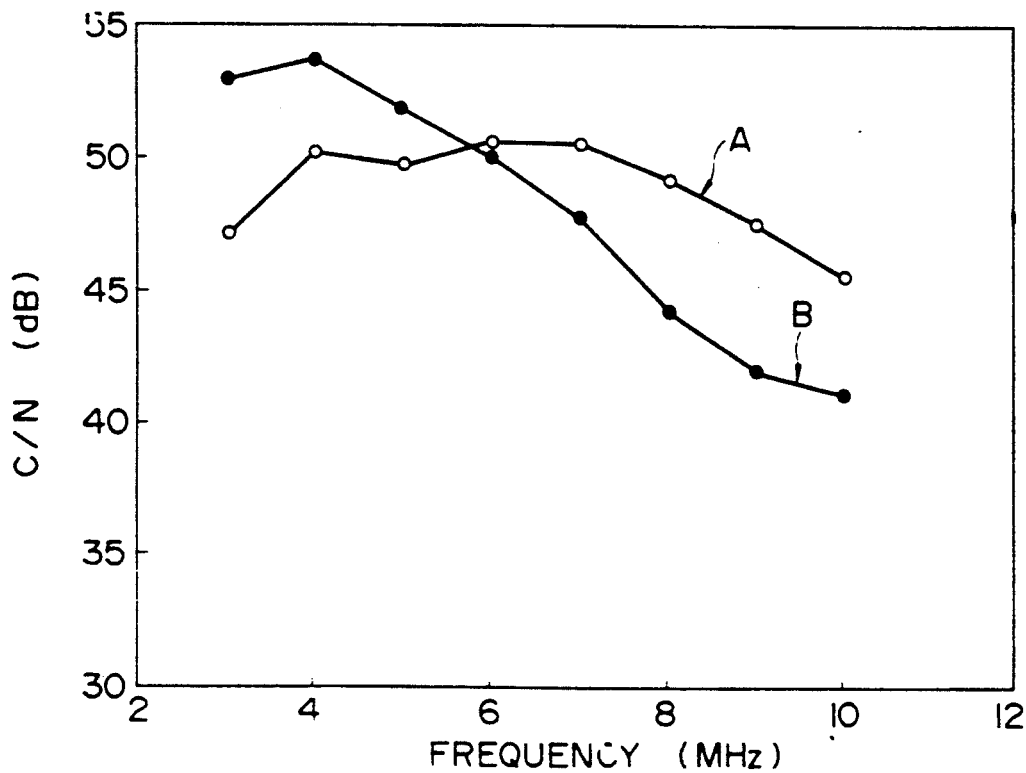

F I G. 27A
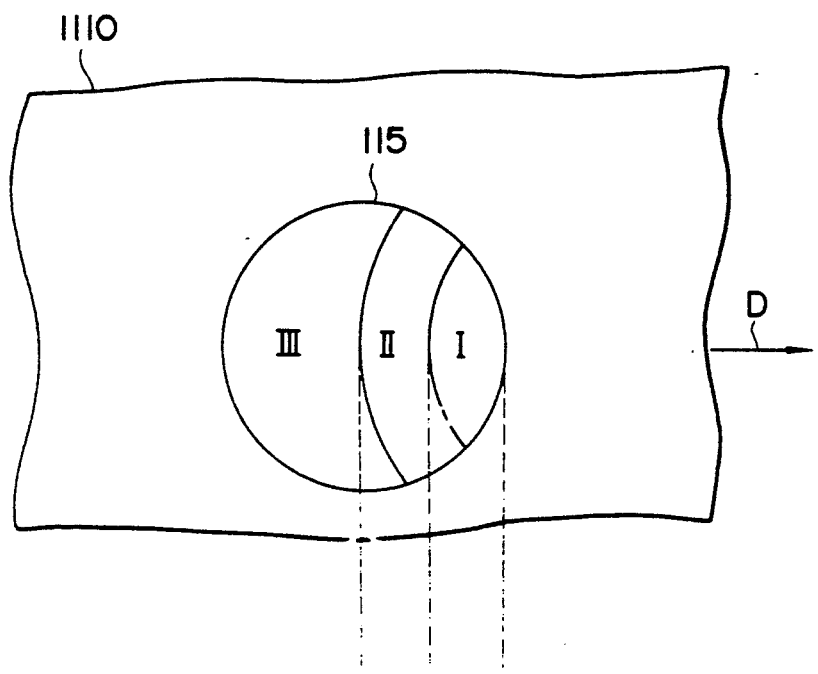
F I G. 27B
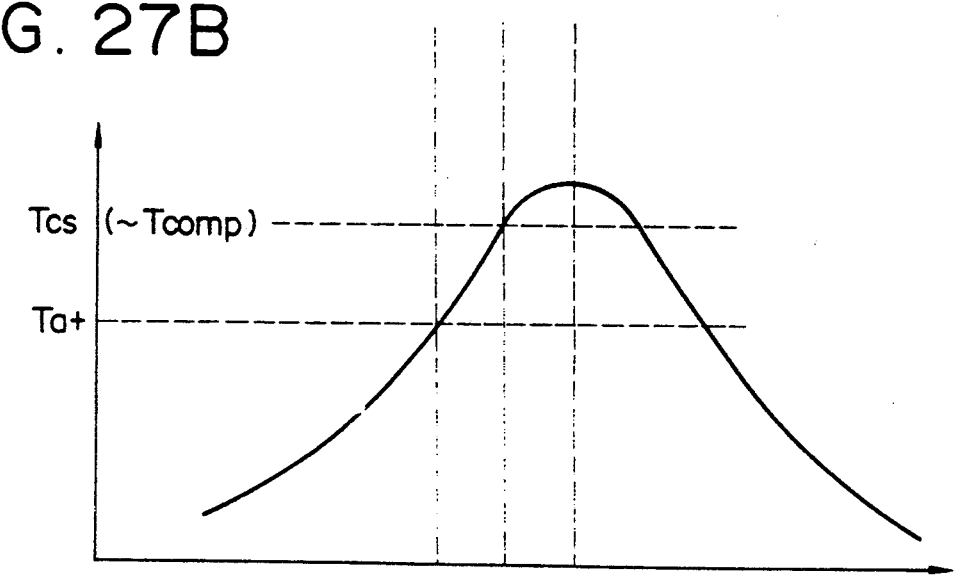

SYSTEM AND METHOD OF REPRODUCING SIGNALS RECORDED ON A MAGNETO-OPTIC RECORDING MEDIUM

BACKGROUND OF THE INVENTION

The present invention relates to a system and method of reproducing signals recorded on a magneto-optic recording medium, for reading information bits (magnetic domains) by magneto-optic effect and, more particularly, to techniques for enhancing track recording density and track density, and reproducing information recorded in a high density and for reproducing with high resolution.

According to the fundamental principle of a magneto-optic recording system, a portion of a magnetic thin film is heated locally to a temperature higher than the Curie temperature or the compensation temperature to nullify the coercive force of the heated portion and to invert the direction of magnetization of the heated portion in the direction of an external recording magnetic field applied thereto. Accordingly, the magneto-optic recording system employs a magneto-optic recording medium comprising a transparent substrate, such as a polycarbonate substrate, and a laminated recording layer formed on one major surface of the transparent substrate, and consisting of a magnetic recording film having an easy direction of magnetization perpendicular to its surface and having excellent magneto-optic characteristics, such as an amorphous rare earth metal-transition metal alloy film, a reflecting film and a dielectric film. The magneto-optic recording medium is irradiated with a laser beam from the side of the transparent substrate to read signals.

The track recording density of optical disks, such as digital audio disks (so-called compact disks) and video disks as well as a magneto-optic recording medium, is dependent principally on the SN ratio of reproduced signals, and the signal quantity of reproduced signals is greatly dependent on the period of the bit string of recorded signals, the wavelength of a laser beam emitted by the laser of a reproducing optical system, and the numerical aperture of the objective lens of the reproducing optical system.

The bit period f corresponding to a detection limit is expressed by: $f=\lambda/2N.A.$, where $\lambda$ is the wave length of a laser beam emitted by the laser of the reproducing optical system, and N.A. is the numerical aperture of the objective lens.

Since crosstalk limiting the track density is dependent mainly on the intensity distribution (profile) of the laser beam on the surface of the recording medium, the track density, similarly to the bit period, is expressed generally by a function of $\lambda/2$ and the numerical aperture N.A.

Accordingly, the reproducing optical system employs, basically, a laser that emits a laser beam of a short wavelength $\lambda$ and an objective lens having a large numerical aperture N.A.

However, according to the present status of the art, an improvement in the wavelength $\lambda$ of the laser beam and the numerical aperture N.A. of the objective lens is limited. On the other hand, techniques have been developed to improve recording density through the improvement of the construction of the magneto-optic recording medium and the reading method.

For example, the applicant of the present patent application proposed a system that improves reproducing resolution by locally enlarging, reducing or extinguishing an information bit (magnetic domain) in reproducing a signal in Japanese Patent Laid-open (Kokai) Nos. Hei 1-143041 and Hei 1-143042, both incorporated herein. This system employs a magnetic recording layer of an exchange-coupled multilayer film consisting of a reproducing layer, an intermediate layer and a record hold layer, and reduces interference between information bits in reproducing signals by heating a magnetic domain of the reproducing layer with a reproducing light beam to enlarge, reduce or extinguish a portion of the magnetic domain heated at a high temperature to enable the reproduction of signals of a period beyond the limit of diffraction of light.

Although the track recording density can be improved to some extent by this system, it is difficult to improve the track density by this system.

Under such circumstances, the applicant of the present patent application proposed a novel signal reproducing method capable of preventing crosstalk and improving both track recording density and track density in Japanese Patent Laid-open (Kokai) No. Hei 1-229395, incorporated herein. This method employs a recording layer of a multilayer film consisting of a reproducing layer and a record hold layer magnetically coupled with the reproducing layer. The direction of magnetization of the reproducing layer is turned beforehand in a direction to erase signals in the reproducing layer. The reproducing layer is heated to a temperature higher than a predetermined temperature by irradiating the reproducing layer with a laser beam when reproducing signals so as to transfer only the magnetic signals written in the heated region of the record hold layer to the reproducing layer in order to read the magnetic signals.

In reading information recorded in information recording bits, i.e., bubble magnetic domains, formed in a magneto-optic recording medium by locally heating the magneto-optic recording medium with a laser beam by a magneto-optic recording/reproducing system utilizing magneto-optic mutual action, namely, the Kerr effect or Faraday effect, as explained above the recording bits must be formed in a reduced size to increase recording density for magneto-optic recording. However, the reduction in size of recording bits entails problems in resolution, as described above, in reproducing recorded information. Resolution is dependent on. the wavelength of the reproducing laser beam, and the numerical aperture N.A. of the objective lens.

A conventional magneto-optic recording/reproducing system will be described with reference to FIGS. 1A, 1B, 1C, and 1D. FIG. 1A is a typical top plan view of a recording pattern. A method of reproducing binary signals "1" and "0" recorded in recording bits 4, i.e. shaded portions in FIG. 1A, of a magneto-optic recording medium 3, such as a magneto-optic disk, will be described. A reading laser beam forms a circular spot 6 on the magneto-optic recording medium 3. When recording bits 4 are spaced so that the spot 6 is able to include only one recording bit 4 as shown in FIG. 1A, the spot 6 includes a recording bit 4 as shown in FIG. 1B, or the spot 6 does not include any recording bit 4 as shown in FIG. 1C. Accordingly, if the recording bits 4 are arranged at equal intervals, the output signal has, for example, a sinusoidal waveform whose amplitude varies alternately above and below a reference level 0 as shown in FIG. 1D.

However, if recording bits 4 are arranged in a high density as shown in a typical plan view of a recording pattern in FIG. 2A, it is possible that the spot 6 includes a plurality of recording bits 4. Since a reproduced output signal provided when the two recording bits 4a and 4b among the successive three recording bits 4a, 4b, and 4c are included in one spot 6 as shown in FIG. 2B and a reproduced output signal provided when the two recording bits 4b and 4c are included in one spot 6 as shown in FIG. 2C are the same and cannot be discriminated from each other, the reproduced output signals form, for example, a straight line as shown in FIG. 2D.

Since the conventional magneto-optic recording/reproducing system reads directly the recording bits 4 recorded on the magneto-optic recording medium 3, the restrictions on the reproducing resolutions cause problems in S/N (C/N—carrier-to-noise ratio) and hence the magneto-optic recording/reproducing system is unable to achieve high-density recording and reproducing, even if the magneto-optic recording/reproducing system is capable of high-density recording, i.e., high-density bit formation.

The reproducing resolution dependent on the wavelength $\lambda$ of the laser beam and the numerical aperture N.A. of the lens must be improved to solve the problems in S/N (C/N). To solve these problems, the applicant of the present patent application proposed previously a magneto-optic recording/reproducing system capable of very high resolution (hereinafter referred to as "MSR system"), for example, in Japanese Patent Application No. Hei 1-225685, "Magneto-optic Recording/Reproducing Method", incorporated herein.

The MSR system enhances the reproducing resolution by reading only the recording bit 4 of a temperature in a predetermined temperature range on a magneto-optic recording medium by utilizing a temperature distribution formed by the relative movement between the magneto-optic recording medium and the spot 6 of the reproducing beam.

The MSR systems are classified into those of a so-called emergence type and those of an extinction type.

The MSR system of an emergence type will be described with reference to FIGS. 3A, 3B, 3C, and 3D. FIG. 3A is a typical top plan view of a recording pattern formed on a magneto-optic recording medium 10, and FIG. 3B is a typical sectional view showing a state of magnetization of the magneto-optic recording medium. As shown in FIG. 3A, the magneto-optic recording medium 10 moves in the direction of an arrow D relative to the spot 6 of a laser beam. As shown in FIG. 3B, the magneto-optic recording medium 10 is, for example, a magneto-optic disk having at least a reproducing layer 11 and a recording layer 13 formed of perpendicularly magnetizable films. The reproducing layer 11, the recording layer 13 and an intermediate layer 12 formed between the reproducing layer 11 and the recording layer 13 are provided. Arrows in the layers 11, 12, and 13 in FIG. 3B indicate the directions of magnetic moment. In FIG. 3B, magnetic domains indicated by downward arrows are in an initial state. Information recording bits 4 are formed at least in the recording layer 13 with magnetic domains magnetized upward for binary values "1" or "0".

In reproducing recorded information signals from the magneto-optic recording medium 10, an external initializing magnetic field $H_1$ is applied to the magneto-optic recording medium 10 to magnetize the reproducing layer 11 downward, as viewed in FIG. 3B, for initialization. Although the recording bits of the reproducing layer are extinguished by initialization, the respective directions of magnetization of regions in the reproducing layer 11 and the recording layer 13 corresponding to the recording bits 4 are maintained reverse to each other by magnetic domain walls formed in the intermediate layer 12, so that the recording bits 4 remain in latent recording bits 41.

A reproducing magnetic field $H_r$ of a direction reverse to that of the initializing magnetic field $H_i$ is applied at least to the reproducing regions of the magneto-optic recording medium 10. As the magneto-optic recording medium 10 moves, the region having the initialized latent recording bit 41 comes under the spot 6. Since the duration of irradiation with the beam in the front side, the left side in FIGS. 3A and 3B, on the magneto-optic recording medium 10 with respect to the direction of movement is longer, a high-temperature region 14 is formed in the front side of the spot 6 as indicated by a shaped area enclosed by a broken line a. In the high-temperature region 14, magnetic domain walls in the intermediate layer 12 disappear, and the magnetization of the recording layer 13 is transferred to the reproducing layer 11 by exchange force, so that the latent recording bit 41 in the recording layer 13 emerges in the reproducing layer 11 in a reproducible recording bit 4.

Accordingly, the recording bit 4 can be read out by detecting the rotation of the plane of polarization of the spot 6 by magneto-optic effect, namely, Kerr effect or Faraday effect, corresponding to the direction of magnetization of the reproducing layer 11. Latent recording bits 41 in a low-temperature region 15, other than the high-temperature region 14, in the spot 6 do not emerge into the reproducing layer 11, and hence the reproducible recording bit 4 is included only in the narrow high-temperature region 14. Therefore, even if information is recorded in a high recording density on the magneto-optic recording medium 10 capable of high-density recording, in which a plurality of recording bits 4 are included in the spot 6, only one of the recording bits 4 can be read for high-resolution signal reproducing.

To carry out signal reproducing in such a mode, the initializing magnetic field $H_i$, the reproducing magnetic field $H_r$, the respective coercive force, values of thickness, intensities of magnetization and values of domain wall energy of the magnetic layers are determined selectively according to the temperature of the high-temperature region 14 and that of the low-temperature region 15. The coercive force $H_{c1}$, thickness $h_1$ and saturation magnetization $M_{s1}$ of the reproducing layer 11, and the coercive force $H_{c3}$, thickness $h_3$ and saturation magnetization $M_{s3}$ of the recording layer 13 must meet an expression in Mathematical 1 to initialize only the reproducing layer 11.

(Mathematical 1)

$$H_i > H_{c1} \sigma_{w2}/2M_{s1} \cdot h_1$$

where $\sigma_{w2}$ is domain wall energy of the magnetic domain wall between the reproducing layer 11 and the recording layer 13.

An expression in Mathematical 3 must be met to maintain the information recorded in the recording layer 13 by the magnetic field.

(Mathematical 3)

$$H_i < H_{c3} - \sigma_{w2}/2M_{s3} \cdot h_3$$

An expression in Mathematical 4 must be met to maintain the magnetic domain walls formed in the intermediate layer 12 between the reproducing layer 11 and the recording layer 13 after the initializing magnetic field $H_i$ has been applied to the magneto-optic recording medium.

(Mathematical 4)

$$H_{c1} > \sigma_{w2}/2M_{s1} \cdot h_1$$

An expression in Mathematical 5 must be met to heat the high-temperature region 14 at a selected temperature $T_H$.

(Mathematical 5)

$$H_{c1} - \sigma_{w2}/2M_{s1} \cdot h_1 < H_r < H_{c1} + \sigma_{w2}/2M_{s1} \cdot h_1$$

The magnetization of the latent recording bits 41 of the recording layer 13 can be transferred to, namely, binary values "1" and "0", which can be made to emerge in only regions of the reproducing layer 11 corresponding to the magnetic domain walls of the intermediate layer 12 by applying the reproducing magnetic field $H_r$ meeting the expression in Mathematical 5.

Although the magneto-optic recording medium 10 employed by the MSR system has the reproducing layer 11, the intermediate layer 12 and the recording layer 13 forming a three-layer construction, the MSR system may employ a four-layer magneto-optic recording medium additionally provided with an auxiliary reproducing layer 17 between the reproducing layer 11 and the intermediate layer 12 as shown in an enlarged schematic sectional view in FIG. 4.

The auxiliary reproducing layer 17 supplements the characteristics of the reproducing layer 11 to compensate the coercive force of the reproducing layer 11 at a room temperature to stabilize the magnetization of the reproducing layer 11 caused by the initializing magnetic field $H_i$ regardless of the existence of magnetic domain walls and to decrease the coercive force sharply at a temperature near the reproducing temperature so that the magnetic domain walls of the intermediate layer 12 expand into the auxiliary reproducing layer 17 to finally invert the reproducing layer 11 and to extinguish the magnetic domain walls for satisfactory emergence of the recording bits.

The coercive force $H_{c1}$ of the reproducing layer 11 of a four-layer magneto-optic recording medium provided with the auxiliary reproducing layer 17 is substituted by $H_{CA}$ as expressed by an expression in Mathematical 6, and $\sigma_{w2}/M_{s1} \cdot h_1$ is substituted by $\sigma_{w2}/(M_{s1} \cdot h_1 + M_{ss} \cdot h_s)$.

(Mathematical 6)

$$H_{CA} = (M_{s1} \cdot h_1 \cdot H_{c1} + M_{ss} \cdot h_s \cdot H_{cs})/(M_{s1} \cdot h_1 + M_{ss} \cdot h_s).$$

where $H_{c1} < H_{CA} < H_{cs}$ for the MSR system of an emergence type.

In Mathematical 6, $M_{ss}$, $h_s$ and $H_{cs}$ are the saturation magnetization, thickness and coercive force, respectively, of the auxiliary reproducing layer 17.

The MSR system of an extinction type will be described hereinafter with reference to FIGS. 5A and 5B. FIG. 5A is a typical top plan view of a recording pattern formed on a magneto-optic recording medium 10, and FIG. 5B is a typical sectional view showing a state of magnetization, in which parts like or corresponding to those shown in FIGS. 3A and 3B are denoted by the same reference characters and the description thereof will be omitted to avoid duplication. This magneto-optic recording medium does not need any initializing magnetic field $H_i$.

A reproducing operation for reproducing information recorded on the magneto-optic recording medium 10 will be described. The high-temperature region 14 is heated so that an expression in Mathematical 7 is satisfied, and then, an external reproducing magnetic field $H_r$ is applied to the magneto-optic recording medium 10 to extinguish recording bits 4 in the high-temperature region 14 included in the spot 6 of a laser beam in the reproducing layer 11 magnetized downward as viewed in FIG. 5B. Thus, the MSR system of an extinction type enables information recorded in only the recording bits 4 in the low-temperature region 15 in the spot 6 to be reproduced to improve the resolution.

(Mathematical 7)

$$H_r > H_{c1} + \sigma_{w2}/\pi M_{s1} \cdot h_1$$

However, the conditions including the coercive force are determined so that the recording bits 4 of the recording layer 13 remain in latent recording bits 41 in an extinction state to hold the magnetization of the recording layer 13, i.e., the recording bits 4, are transferred to the reproducing layer 11 and held therein in a reproducible state at a room temperature.

The foregoing MSR systems of an emergence type and an extinction type reproduce the recording bit in a local region included in the spot of the recording laser beam to reproduce the information in and enhanced resolution.

In reproducing signals by these previously proposed signal reproducing methods, however, the area to be transferred to the reproducing layer (reproducible area) expands with the increase of reproducing power, which deteriorates frequency characteristics of reproduction.

SUMMARY OF THE INVENTION

The present invention has been made in view of the foregoing problems and it is therefore an object of the present invention to provide a signal reproducing method capable of improving both track recording density and track density and of obviating the deterioration of frequency characteristics due to increase in reproducing power.

To achieve this object, the present invention provides a method of reproducing signals recorded on a magneto-optic recording medium comprising at least a recording layer formed of a multilayer film consisting of a reproducing layer, an intermediate layer and a record hold layer, which are coupled magnetically. The reproducing layer is initialized by an initializing magnetic field to turn the direction of magnetization of the reproducing layer in an initial direction after recording signals in the record hold layer of the magneto-optic recording medium. The reproducing layer is irradiated with a laser beam and a reproducing magnetic field is applied to the reproducing layer to create a portion maintaining the initial state, a portion to which the magnetic domain pattern of the record hold layer is transferred, and a portion having the same magnetic polarity as that of the reproducing magnetic field in an area corresponding to the spot of the laser beam by a temperature distribution formed by the laser beam. A magnetic signal recorded in the portion to which the magnetic domain pattern of the record hold layer has been transferred is converted by magneto-optic effect to read the magnetic signal.

The method of reproducing signals in accordance with the present invention turns the polarity of the magnetic field created in the reproducing layer from which signals are read in a predetermined direction by the initializing magnetic field to set the reproducing layer in an erased state.

Then, the method irradiates the reproducing layer in the erased state with a laser beam and applies a reproducing magnetic field to the reproducing layer simultaneously. A portion maintaining the initial state, a portion to which the magnetic domain pattern of the record hold layer is transferred and a portion having the same magnetic polarity as that of the reproducing magnetic field are created in an area corresponding to the spot of the laser beam by a temperature distribution formed by the laser beam.

The state of magnetization of the portion maintaining the initial state and that of the portion having the same magnetic polarity as that of the reproducing magnetic field are always the same regardless of the pattern of magnetization of the record hold layer.

Accordingly, these portions are masked optically and recorded signals are read only from the portion to which the magnetic domain pattern has been transferred, which enables high-density reproduction.

Even if the reproducing power varies during reproduction, the area of the portion from which signals can be reproduced hardly varies, so that the frequency characteristics can be maintained.

In a second embodiment, a four-layer medium is provided, as described hereafter.

The present invention is also intended to further improve the reproducing resolution, namely, S/N (C/N Carrier-to-Noise ratio), in the MSR system. In this regard, attention is drawn to the third and fourth embodiments explained hereafter.

FIG. 21A is a typical top plan view of a magneto-optic recording medium employed in carrying out a magneto-optic recording/reproducing system in accordance with a third embodiment of the present invention. FIG. 21B is a typical sectional view of the same magneto-optic recording medium, and FIG. 21C is a graph showing temperature distribution on the same magneto-optic recording medium. The present invention provides a magneto-optic recording/reproducing system comprising irradiating a magneto-optic recording medium 1000 having at least a recording layer 130, a reproducing layer 110, and an intermediate layer 120 formed between the recording layer 130 and the reproducing layer 110. A reading light beam and a reproducing magnetic field $H_r$ having a same direction as that of magnetization of the reproducing layer 110 is provided. A high-temperature region 140 and a reproducible region 160 heated at a temperature suitable for reproducing information are provided in an area irradiated with the reading light beam. A portion of the intermediate layer 120 in the high-temperature region is heated to a temperature not lower than the Curie temperature $T_{c2}$ of the intermediate layer 120. The reproducible region 160 meets an expression: $H_r + H_{CA} < H_{w1}$, where $H_{CA}$ is a coercive force of a layer contributing to reproducing information, and $H_{w1}$ is a magnetic field created by a magnetic domain wall between the reproducing layer 110 and the intermediate layer 120.

According to a fourth embodiment of the present invention, a magneto-optic recording medium as shown in FIG. 26 is provided having at least a reproducing layer 111, an auxiliary reproducing layer 131 and a recording layer 113 which are coupled magnetically. The reproducing layer 111 is heated with a laser beam to transfer magnetic signals recorded on the recording layer 113 to the reproducing layer 11. The magnetic signals are converted into light signals by magneto-optic effect for reading. The reproducing layer 111 is formed of a ferromagnetic material having a compensation temperature $T_{comp}$ nearly equal to the Curie temperature $T_{cs}$ of the auxiliary reproducing layer 131.

BRIEF DESCRIPTION OF THE DRAWINGS

The above and other objects, features and advantages of the present invention will become more apparent from the following description taken in connection with the accompanying drawings, in which:

FIG. 4 is a typical sectional view of a magneto-optic recording medium;

FIG. 19 is a graph showing the variation of C/N with the composition of the auxiliary reproducing layer of a four-layer magneto-optic recording medium;

FIG. 20 is a graph showing the frequency characteristics of C/N in carrying out a signal reproducing method in a preferred embodiment according to the present invention in comparison with carrying out a signal reproducing method using only an initialized region and a transfer region for reproducing operation;

FIGS. 21A to 21D are diagrammatic views for assistance in explaining a magneto-optic recording/reproducing system in a third embodiment according to the present invention;

FIGS. 27A and 27B are diagrams showing a temperature distribution of an area of the magneto-optic recording medium corresponding to the spot of a beam;

DESCRIPTION OF THE PREFERRED EMBODIMENTS

Preferred embodiments of the present invention will be described hereinafter with reference to the accompanying drawings.

First Embodiment

A signal reproducing method in a first embodiment according to the present invention employs a magneto-optic recording medium 100 having a recording layer of a three-layer construction consisting of a reproducing layer, an intermediate layer, and a record hold layer.

Figure 6:
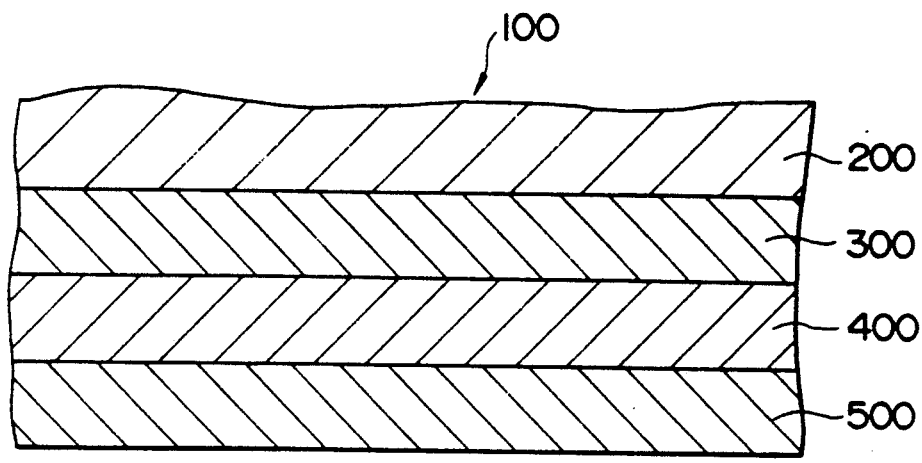
FIG. 6 is a schematic sectional view of an essential portion of a magneto-optic recording medium.

As shown in FIG. 6, the magneto-optic recording medium 100 has a reproducing layer 300, an intermediate layer 400, and a record hold layer 500 formed sequentially in that order on a transparent substrate 200 of polycarbonate or glass.

The reproducing layer 300 is formed of a material having excellent magneto-optic characteristics, a large Kerr rotation angle and a large Faraday rotation angle. The record hold layer 500 is a perpendicularly magnetizable film having a large coercive force. The reproducing layer 300 and the record hold layer 500 are magnetically coupled by magneto-static coupling or exchange coupling.

The reproducing layer 300 has Curie temperature $T_{c1}$, coercive force $H_{c1}$, magnetization $M_{s1}$, and thickness $h_1$. The intermediate layer 400 has Curie temperature $T_{c2}$, coercive force $H_{c2}$, magnetization $M_{s2}$, and thickness $h_2$. The record hold layer 500 has Curie temperature $T_{c3}$, coercive force $H_{c3}$, magnetization $M_{s3}$, thickness $h_3$, and interfacial domain wall energy $\sigma_w$.

Figure 7:
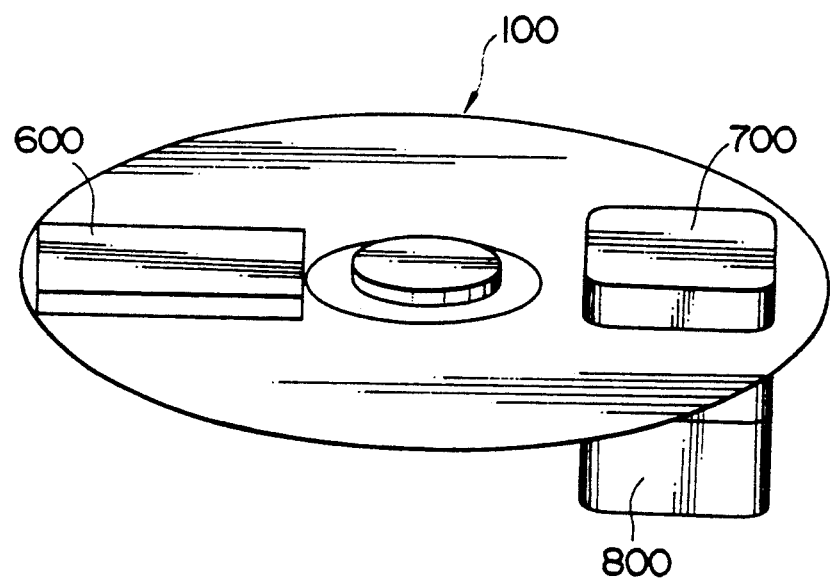
FIG. 7 is a schematic typical perspective view of a magneto-optic reproducing device.

As shown in FIG. 7, a magneto-optic reproducing device for reading information signals recorded on the magneto-optic recording medium is provided with two magnetic heads, namely, an initializing magnet 600 for applying an initializing magnetic field $H_{ini}$ to the magneto-optic recording medium 100 and a reproducing magnet 700 for applying a reproducing magnetic field $H_{read}$ to the magneto-optic recording medium 100. An optical head (optical pickup) 800 is also provided.

The reproducing magnet 700 and the optical head 800 are disposed at a same position above and below the disk. The initializing magnet 600 is disposed before the reproducing magnet 700 and the optical head 800 with respect to the direction of movement of the magneto-optic recording medium 100.

The signal reproducing method employing the magneto-optic recording medium 100 and the magneto-optic reproducing device will be described hereinafter.

The magneto-optic recording device records information signals on the record hold layer 500 by either a light modulation system or a magnetic field modulation system. It is also possible to record magnetic signals with a magnetic head on a perpendicularly magnetizable film formed contiguously with the record hold layer 500 and to transfer the magnetic signals recorded on the perpendicularly magnetizable film to the record hold layer 500 by irradiating the perpendicularly magnetizable film with a laser beam.

Figure 8:
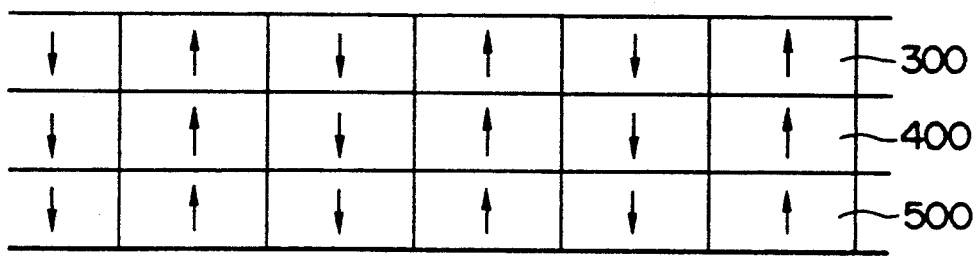
FIG. 8 is a typical view showing a magnetized state of a three-layer magneto-optic recording medium of a first embodiment after signals have been recorded.

FIG. 8 shows a state in which information signals are recorded on the magneto-optic recording medium.

Figure 9:
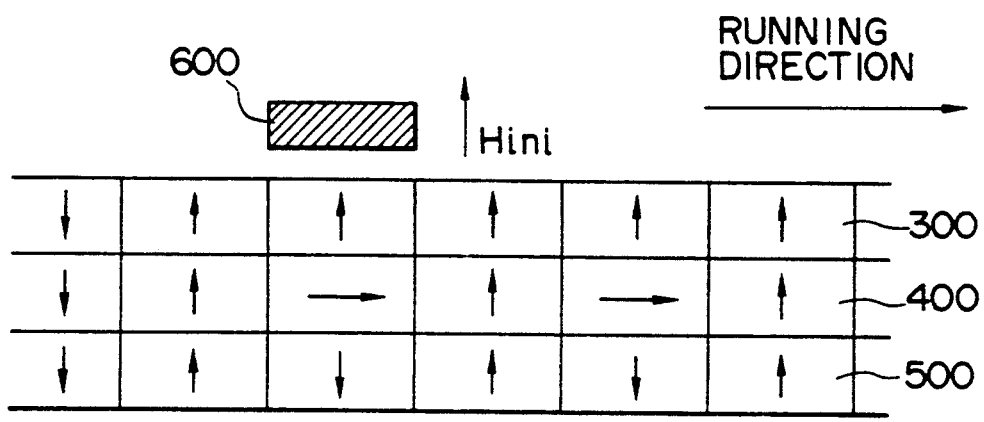
FIG. 9 is a typical view showing a magnetized state of a three-layer magneto-optic recording medium during initialization.

In reproducing the recorded information signals, the initializing magnet 600 applies the initializing magnetic field $H_{ini}$ to the magneto-optic recording medium 100 to initialize only the reproducing layer 300 as shown in FIG. 9.

When the initializing magnetic field $H_{ini}$ is applied to the magneto-optic recording medium 100, the direction of magnetization of the reproducing layer 300 is turned in the direction of the initializing magnetic field $H_{ini}$. In regions where the direction of magnetization of the record hold layer 500 is reverse relative to that of the reproducing layer 300, magnetic domain walls are formed in the intermediate layer 400.

The initializing magnetic field $H_{ini}$ must satisfy the expression $$H_{inf} > H_{c2} - \sigma_w / 2M_{s3} \cdot h_3 \quad (1)$$

to invert the direction of magnetization of the reproducing layer 300.

The initializing magnetic field $H_{ini}$ must satisfy the expression $$H_{ini} < H_{c3} - \sigma_w/2M_{s3} \cdot h_3 \quad (2)$$

to hold the information signals stored on the record hold layer 500 when the initializing magnetic field $H_{ini}$ is applied to the magneto-optic recording medium 100.

The following expression must be satisfied to maintain the magnetic domain walls between the reproducing layer 300 and the record hold layer 500 after the initializing magnetic field $H_{ini}$ has been applied to the magneto-optic recording medium 100.

$$H_{c1} > \sigma_w/2M_{s1} \cdot h_1 \quad (3)$$

After the reproducing layer 300 has been initialized, the magneto-optic recording medium 100 is irradiated with a laser beam by the optical head 800 and a reproducing magnetic field $H_{read}$ is applied to the same by the reproducing magnet 700 at the position where the reproducing magnet 700 and the optical head 800 are disposed relative to one another to read the information signals.

Figure 1A:
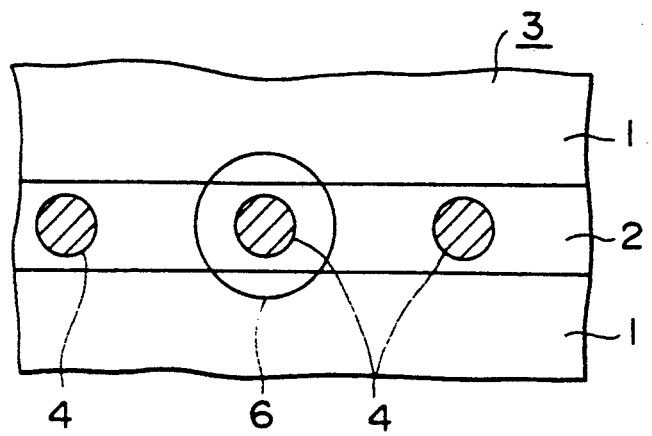
FIGS. 1A to 1D are views for assistance in explaining a conventional magneto-optic recording/reproducing system.
Figure 1B:
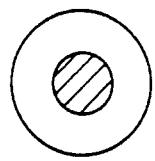
Figure 1C:
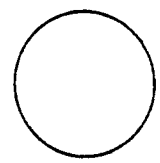
Figure 1D:
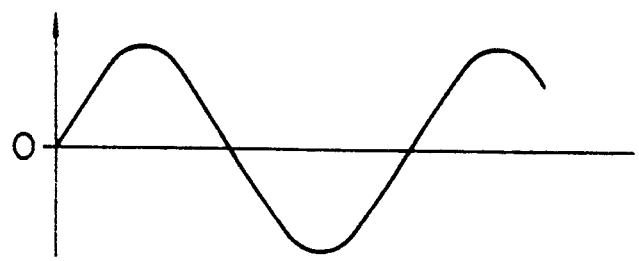
Figure 2A:
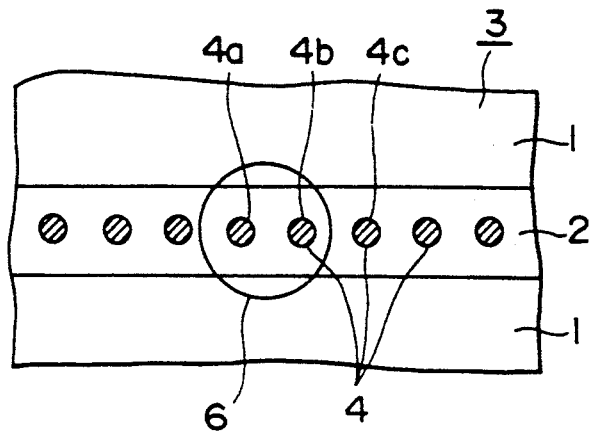
FIGS. 2A to 2D are views for assistance in explaining a conventional magneto-optic recording/reproducing system.
Figure 2B:
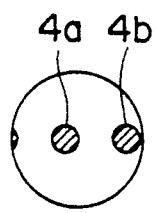
Figure 2C:
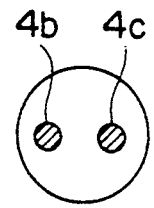
Figure 2D:
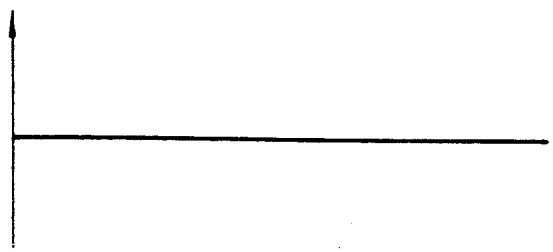
Figure 3A:
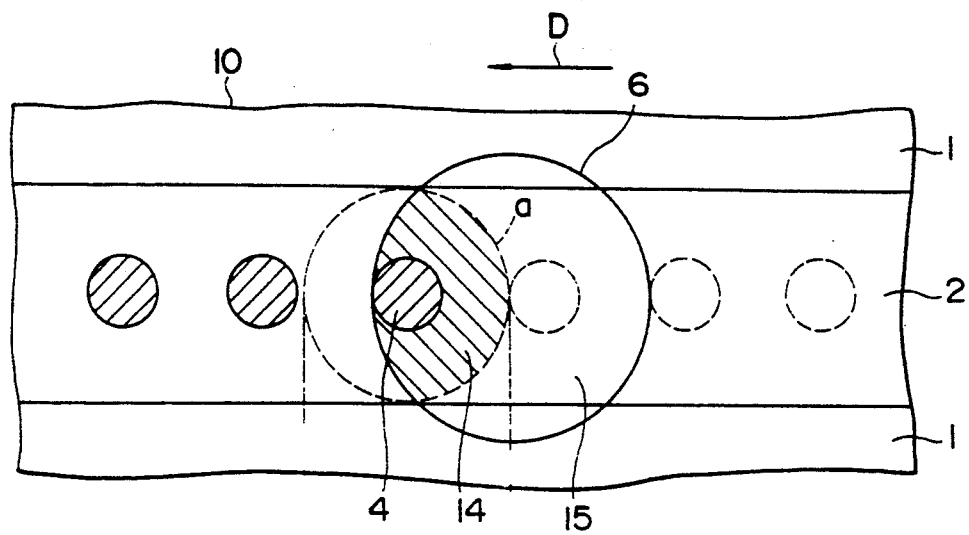
FIGS. 3A and 3B are views for assistance in explaining a MSR system of an emergence type.
Figure 3B:
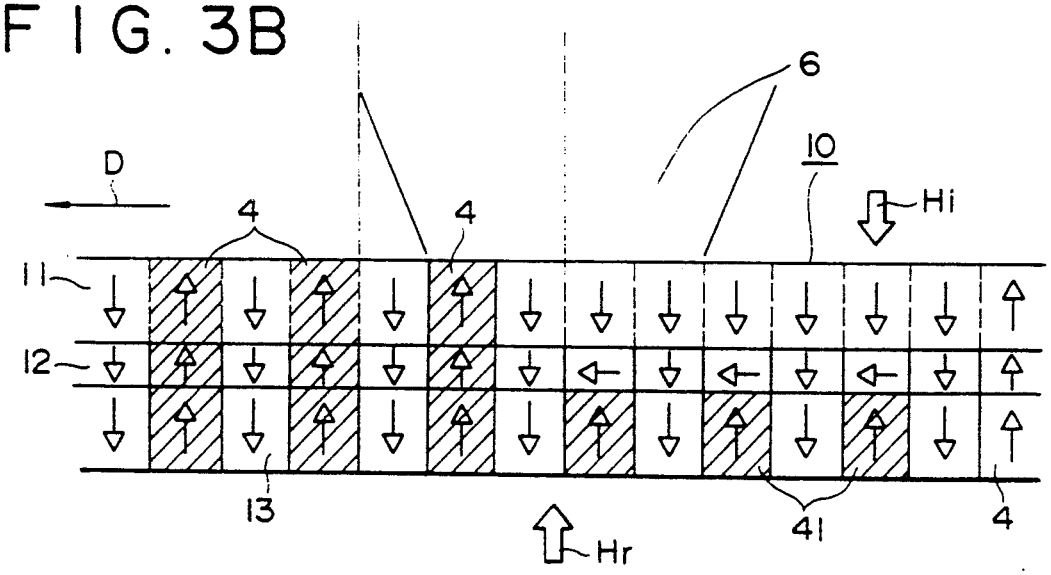
Figure 5A:
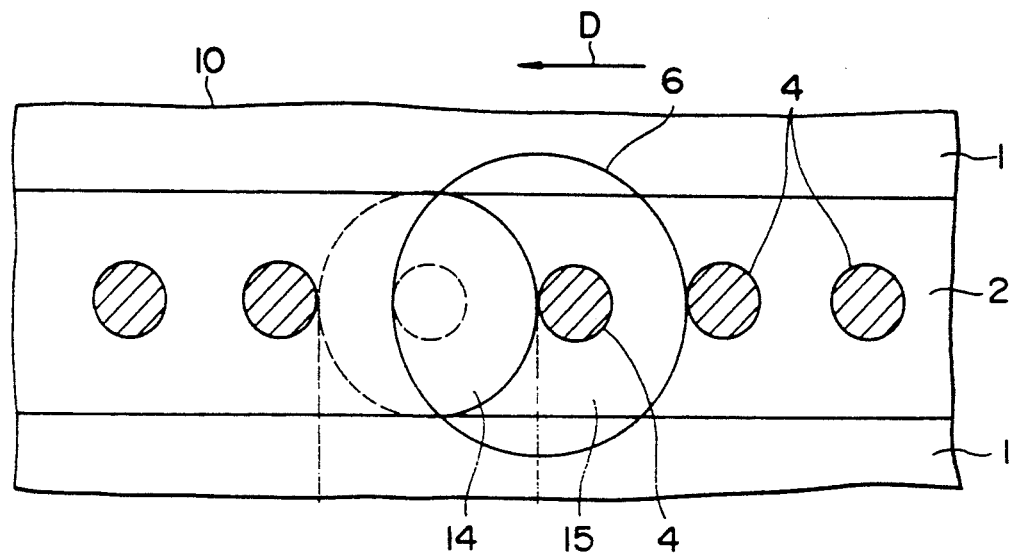
FIGS. 5A and 5B are views for assistance in explaining a MSR system of an extinction type.
Figure 5B:
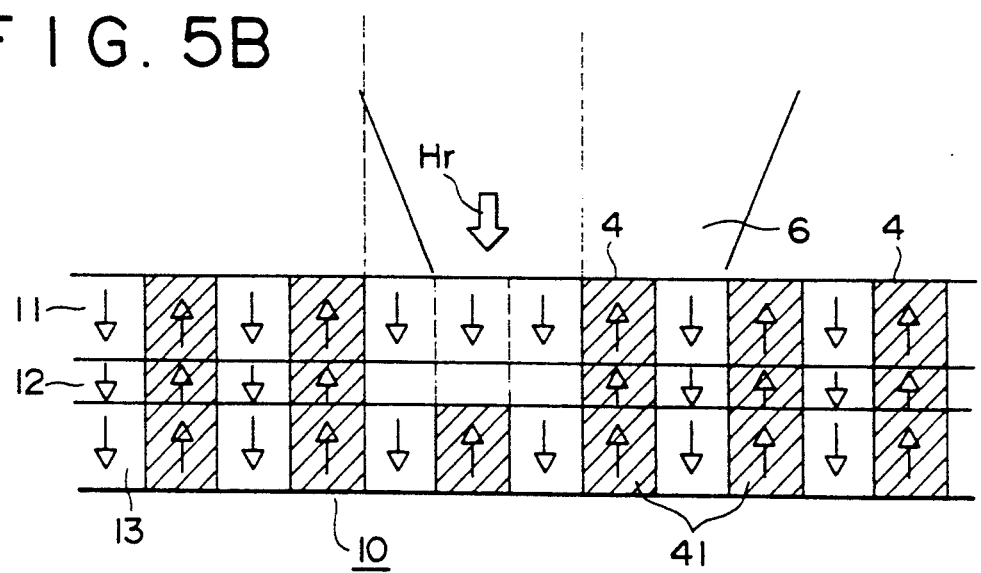

When the magneto-optic recording medium 100 is irradiated with the laser beam LB to read the information signals, the magneto-optic recording medium 100 is heated in a temperature distribution as shown in FIG. 5.

In this temperature distribution, the temperature of the front portion of the magneto-optic recording medium 100 with respect to the running direction indicated by an arrow X is the highest, and temperature decreases gradually toward the back portion.

If the reproducing magnetic field $H_{read}$ satisfies the expression $$H_{c1} - \sigma_w/2M_{s1} \cdot h_1 < H_{read} < H_{c1} + \sigma_w/2M_{s1} \cdot h_1 \quad (4)$$

is applied to the reproducing layer 300 of a temperature not lower than $T_m$ ($T_m < T_{c2}$, $T_{c2} < T_{c1}$, and $T_{c2} < T_{c3}$), the direction of magnetization of regions in which magnetic domain walls are formed can be inverted by the exchange force between the reproducing layer 300 and the record hold layer 500.

Accordingly, the magnetic domain pattern P of the record hold layer 500 corresponding to a region of the magneto-optic recording medium heated to a temperature not lower than the temperature $T_m$ is transferred to the reproducing layer 300.

A region heated to a temperature not lower than a temperature $T_m$, ($T_m' > T_m$, $T_m' < T_{c1}$, and $T_m' < T_{c3}$) satisfies and inequality: $H_{read} > H_{c1} + \sigma_w/2M_{s1} \cdot h_1$. In this state, the reproducing layer is magnetized in the direction of the reproducing magnetic field. Such a region is a region $\alpha$ in FIG. 10.

Figure 10A:
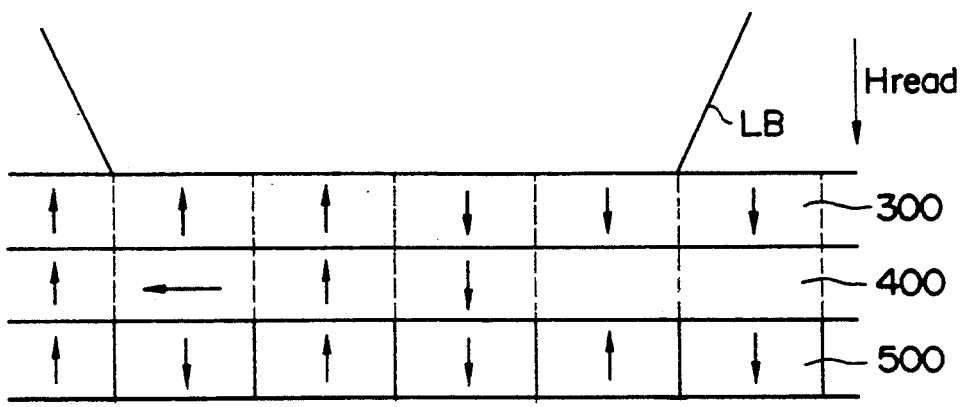
FIG. 10 is a view showing a temperature profile in a portion irradiated with a laser beam for signal reproduction and a magnetized state during signal reproducing operation.
Figure 10B:
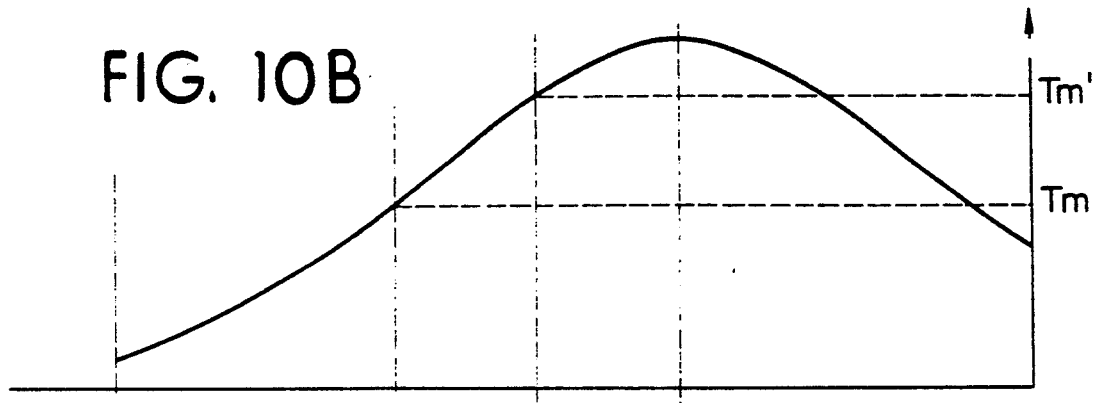
Figure 10C:
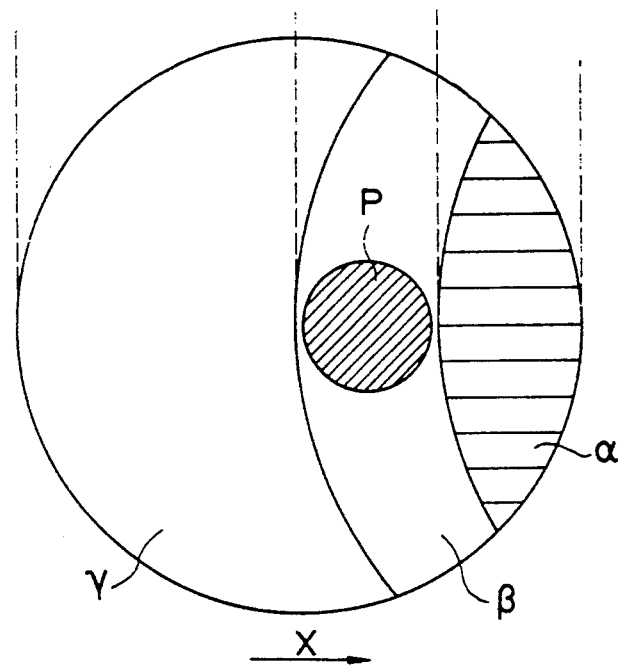

Accordingly, only the magnetic domain pattern P of the region $\beta$ of the record hold layer 500 shown in FIG. 10 is transferred to the reproducing layer 300.

On the other hand, the direction of magnetization of a region $\gamma$ (FIG. 10) heated to a temperature lower than the temperature $T_m$ cannot be inverted by the reproducing magnetic field $H_{read}$, and the region 7 remains in the initial state.

According to the signal reproducing method, the direction of magnetization of the region $\gamma$ in the reproducing layer 300 is always the same as the direction of the initializing magnetic field $H_{ini}$, and the direction of magnetization of the region $\alpha$ in the reproducing layer 300 is turned in the direction of the reproducing magnetic field $H_{read}$. Such a state is equivalent to an optically masked state, which enhances the track recording density greatly. When the temperature distribution is controlled so that the temperature of the boundary between the adjacent reproducing tracks is lower than the temperature $T_m$, the information signal stored in a region of the record hold layer 500 under a track is never transferred to the reproducing layer 300 and hence crosstalk is prevented.

The signal reproducing method in the first embodiment hardly deteriorates frequency characteristics even if the reproducing power of the laser beam varies.

Figure 11:
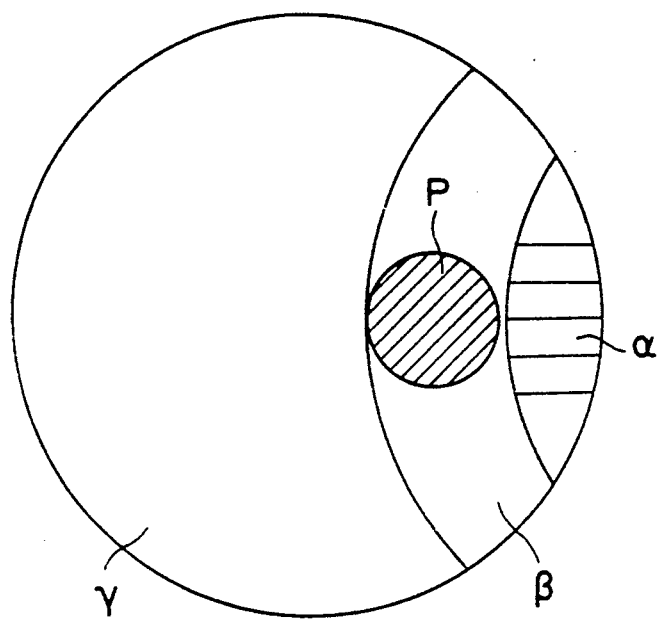
FIG. 11 is a typical view of regions formed within the field of a lens when a small reproducing power is applied to a magneto-optic recording medium.

Although a reduced region is heated to a temperature not lower than the temperature $T_m$ if the reproducing power is low and hence the direction of magnetization of a reduced region of the reproducing layer 300 is inverted as shown in FIG. 11, the size of the region $\beta$ of the record hold layer 500 from which the magnetic domain pattern P is transferred to the reproducing layer 300 is hardly changed because a reduced region (the region $\alpha$) is heated to a temperature not lower than the temperature $T_m'$ if the reproducing power is low.

Figure 12:
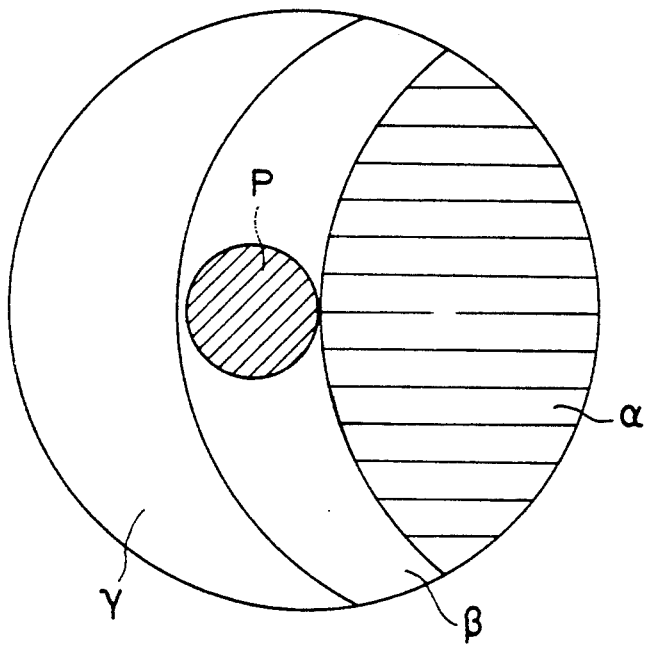
FIG. 12 is a typical view of regions formed within the field of a lens when a large reproducing power is applied to a magneto-optic recording medium.

On the contrary, although an increased region is heated to a temperature not lower than the temperature $T_m$ as shown in FIG. 12 and the direction of magnetization of an increased region of the reproducing layer 300 is inverted if the reproducing power is high, the size of the region $\gamma$ of the record hold layer 500 from which the magnetic domain pattern P is transferred to the reproducing layer 300 is hardly changed because an increased region (the region $\gamma$) is heated to a temperature not lower than the temperature $T_m'$.

Second Embodiment

A signal reproducing method in a second embodiment according to the present invention employs a magneto-optic recording medium having a four-layer recording layer consisting of a reproducing layer, an auxiliary reproducing layer, an intermediate layer, and a record hold layer.

Although the four-layer recording layer is the same in function as the three-layer recording layer, conditions for forming the component layers of the four-layer recording layer are less strict than those for forming the three-layer recording layer.

In the following description of signal reproducing conditions, $T_{c1}$, $H_{c1}$, $M_{s1}$, and $h_1$ are the Curie temperature, coercive force, magnetization, and thickness, respectively, of the reproducing layer 300; $T_{2a}$, $H_{c2a}$, $M_{s2a}$, and $h_{2a}$ are the Curie temperature, coercive force, magnetization, and thickness, respectively, of the auxiliary reproducing layer 400a; $T_{c2b}$, $H_{c2b}$, $M_{s2b}$, and $h_{2b}$ are the Curie temperature, coercive force, magnetization, and thickness, respectively, of the intermediate layer 400b; $T_{c3}$, $H_{c3}$, $M_{s3}$, and $h_3$ are the Curie temperature, coercive force, magnetization, and thickness, respectively, of the record hold layer 500, and $\sigma_{w2b}$ is the interfacial domain wall energy of the intermediate layer 400b.

Figure 13:
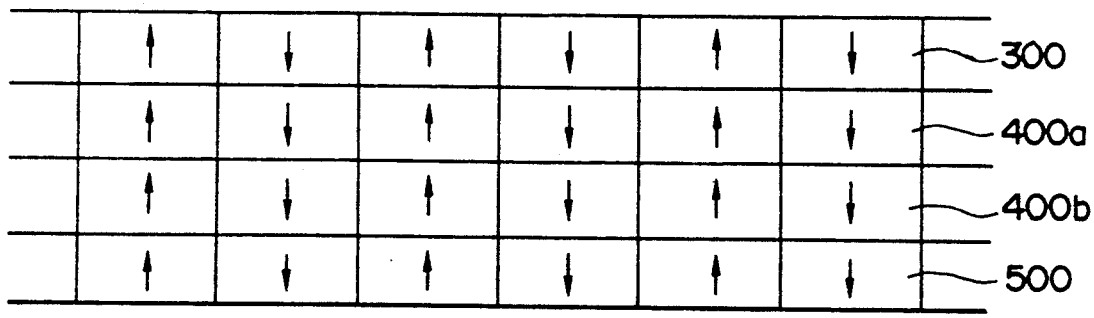
FIG. 13 is a typical view showing a magnetized state of a four-layer magneto-optic recording medium of a second embodiment after signals have been recorded.

Information signals are recorded in the same manner as that carried out by the signal reproducing method in the first embodiment. The information signals are written in all of the four layers as shown in FIG. 13.

Figure 14:
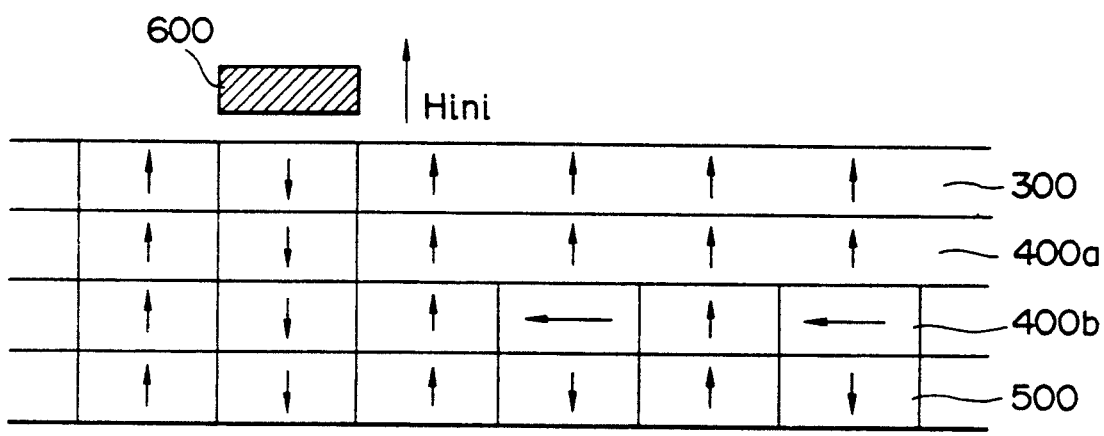
FIG. 14 is a typical view showing a magnetized state of a four-layer magneto-optic recording medium during initialization.

The signal reproducing method in the second embodiment employs the same magneto-optic reproducing device as that employed by the signal reproducing method in the first embodiment. First, an initializing magnetic field $H_{ini}$ is applied to the magneto-optic recording medium to initialize the reproducing layer and the auxiliary reproducing layer 400a in a state as shown in FIG. 14.

The initializing magnetic field $H_{ini}$ must be greater than the sum $H_{c1-}$ of the average coercive force $(H_{c1}, H_{c2a})_{AVG}$ of the coercive the auxiliary reproducing layer 400a, and the interfacial domain wall energy $\sigma_{w2b}$ produced in the intermediate layer 400b to turn the respective directions of magnetization of the reproducing layer 300 and the auxiliary reproducing layer 400a in the direction of the initializing magnetic field $H_{ini}$; that is:

$$H_{ini} > (H_{c1}, H_{c2a})_{AVG} + \sigma_{w2b}/2(M_{s1} \cdot h_1 + M_{s2a} \cdot h_{2a}) = H_{c1+} \quad (5)$$

where $$(H_{c1}, H_{c2a})_{AVG} = (M_{s1} \cdot h_1 + M_{s2a} \cdot h_{2a} \cdot H_{c2a})/(M_{s1} \cdot h_{30} M_{s2a} \cdot h_{2a}) \quad (6)$$

$$H_{c1} < (H_{c1}, H_{c2a})_{AVG} < H_{c2a} \quad (7)$$

The information signals must be held on the record hold layer 500 in turning the direction of magnetization of the reproducing layer 300 and the auxiliary reproducing layer 400a in the direction of the initializing magnetic field $H_{ini}$. Accordingly, the following expression must be satisfied:

$$H_{ini} > H_{c3} - \sigma_{w2b}/2M_{s3} \cdot h_3 \quad (8)$$

The following expression must be satisfied to secure the magnetic domain wall formed in the intermediate layer 400b after initialization by the initializing magnetic field $H_{ini}$.

$$(H_{c1}, H_{c2a})_{AVG} > \sigma_{w2b}/2(M_{s1} \cdot h_1 + M_{s1a} \cdot h_{2a}) \quad (9)$$

Figure 15:
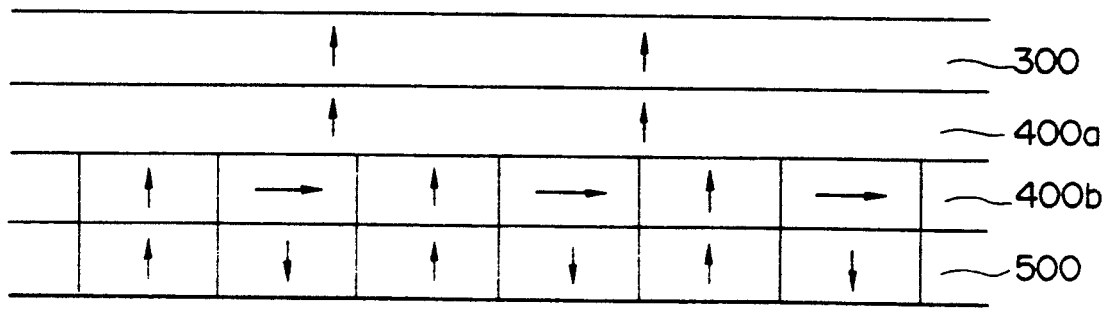
FIG. 15 is a typical view showing a magnetized state of a four-layer magneto-optic recording medium after initialization.

When the component layers of the magneto-optic recording medium meet the foregoing conditions at room temperature, the respective directions of magnetization of regions of the reproducing layer 300 and the auxiliary reproducing layer 400a initialized by the initializing magnetic field $H_{ini}$ are turned in the direction of the initializing magnetic field $H_{ini}$ as shown in FIG. 15 (upward in FIG. 15). This state is maintained until the magneto-optic recording medium is irradiated with a reproducing laser beam, and no reproduced output signal is detected in this state.

Then, the magneto-optic recording medium is irradiated with a laser beam so that the same is heated in a temperature distribution similar to that in the magneto-optic recording medium having the three-layer recording layer, and the reproducing magnetic field $H_{read}$ is applied to the magneto-optic recording medium to read the information signals.

Figure 16A:
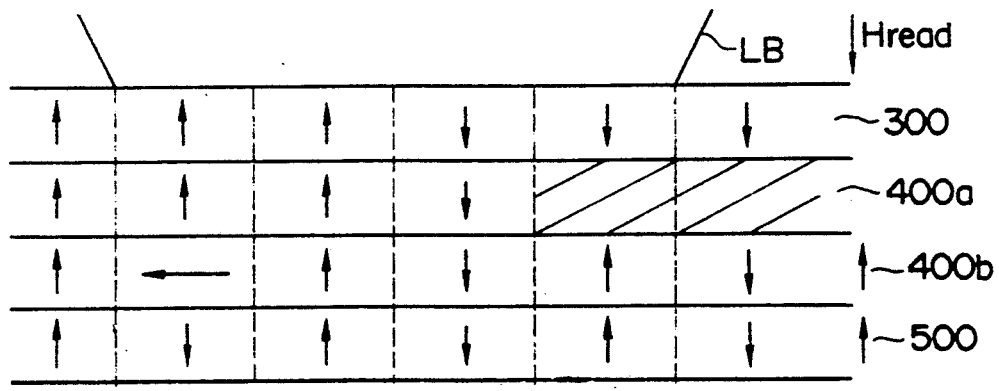
FIG. 16 is a typical view showing a temperature profile formed by irradiation with a laser beam for signal reproduction, and a magnetized state during signal reproducing operation.
Figure 16B:
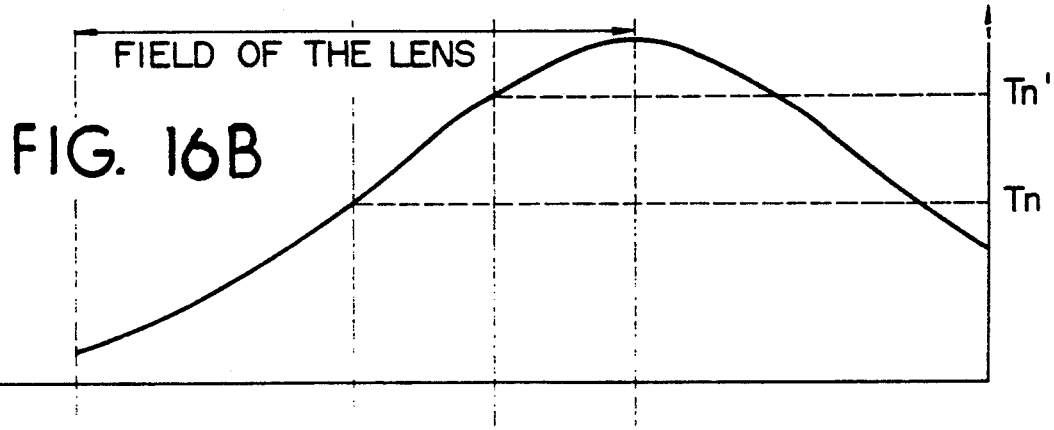
Figure 16C:
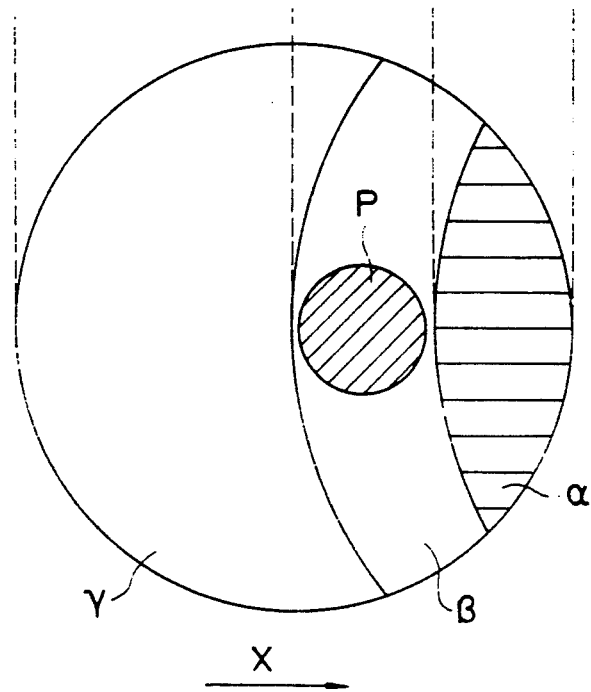

When irradiated with the laser beam LB, the magneto-optic recording medium is heated in a temperature distribution as shown in FIG. 16. In this case also, the temperature of the front portion with respect to the running direction of the magneto-optic recording medium 100 indicated by an arrow X is the highest, and the temperature decreases gradually toward the back portion.

The respective directions of magnetization of regions of the reproducing layer 300 corresponding to magnetic domain walls can be inverted by the exchange force between the reproducing layer 300 and the record hold layer 500 by applying the reproducing magnetic field $H_{read}$ meeting an expression $$H_{c1-} < H_{read} < H_{c1+} \quad (10)$$

to the magneto-optic recording medium at a temperature $T_n$ ($T_n < T_{c2a}$, $T_{c2a} < T_{c1}$, $T_{c2a} < T_{c2b}$, and $T_{c2a} < T_{c3}$).

$$H_{c1-} = (H_{c1}, H_{c2a})_{AVG} - \sigma_{w2b}/2(M_{s1} \cdot h_1 + M_{s2a} \cdot h_{2a}) \quad (11)$$

$$H_{c1+} = (H_{c1}, H_{c2a})_{AVG} - \sigma_{w2b}/2(M_{s1} \cdot h_1 + M_{s2a} \cdot h_{2a})$$

Conditions are determined so that an inequality $H_{read} > H_{c1}$ is satisfied at a temperature not lower than a temperature $T_n'$ ($T_n' > T_n$, $T_n' > T_{c1}$ and $T_n' > T_{c4}$).

When the magneto-optic recording medium is heated in the temperature distribution shown in FIG. 16, in which the temperature of a region $\gamma$ is in the range of a room temperature to $T_n$, the temperature of a region $\beta$ is in the range of $T_n$ to $T_n'$, and the temperature of a region $\alpha$ is not lower than $T_n'$, $H_{read} < H_{c1-}$ in the region $\gamma$. Therefore, the direction of magnetization of the reproducing layer 300 is not inverted, and the reproducing layer 300 and the auxiliary reproducing layer 4a remains in the initialized state, in which the directions of magnetization of the reproducing layer 300 and the auxiliary reproducing layer 400a are the same as the direction of the initializing magnetic field $H_{ini}$.

As mentioned above, since $H_{c1-} < H_{read} < H_{c1+}$ in the region $\beta$, the magnetic domain wall of the intermediate layer 400b corresponding to the region $\beta$ disappears and the information signal is transferred from the record hold layer 500 to the reproducing layer 300 and the auxiliary reproducing layer 400a; that is the magnetic pattern is transferred from the record hold layer 500 to the region $\beta$ and a magnetic domain pattern P corresponding to the recording signal is formed in the region $\beta$.

Since the temperature of the region $\alpha$ is higher than the temperature $T_n'$, and $H_{c1} < H_{read}$ in the region $\alpha$, the direction of magnetization of the reproducing layer 300 is the same as the direction of the reproducing magnetic field $H_{read}$.

Thus, the regions $\gamma$ and $\alpha$ are in a state equivalent to an optically masked state, so that track recording density is increased greatly.

The signal reproducing method in the second embodiment, similarly to the signal reproducing method in the first embodiment, hardly deteriorates frequency characteristics even if the reproducing power of the laser beam varies.

A magneto-optic recording medium meeting the foregoing conditions was fabricated and its C/N characteristic was evaluated.

The magneto-optic recording medium has the following construction.

Reproducing layer 3: GdFeCo (Curie temp. $T_{c1} > 300°$ C.)

Auxiliary reproducing layer 400a: TbFeCoAl (Curie temp. $T_{c2a}$ = about 120° C.)

Intermediate layer 400b: GdFeCo (Curie temp. $T_{c2b}$ = about 250° C.)

Memory layer 500: TbFeCo (Curie temp. $t_{c3}$ = about 300° C.)

When the intermediate layer is a transition metal-rich (TM-rich) layer, the films of the layers were formed in thickness and coercive force as follows:

$H_1 = 300$ Å

$h_{2a} = 50$ to $100$ Å

$(H_{c1}, H_{c2a})_{AVG} = 1$ to $4$ kOe $h_{2b} = 200$ Å

$H_{c2b} < 1$ kOe (TM-rich)

$h_3 = 450$ Å

$H_{c3} = 7$ kOe (TM-rich) to $10$ kOe (RE-rich)

After initializing the magneto-optic recording medium by applying an initializing magnetic field $H_{ini}$ of 4 kOe to the same, a reproducing magnetic field $H_{read}$ in the range of 200 to 600 Oe was applied to the magneto-optic recording medium and the magneto-optic recording medium was irradiated with a laser beam of 300 mW on the surface of the magneto-optic recording medium for signal reproduction. A sufficiently large C/N was obtained for a bit period of 0.8 μm (linear speed = 8 m/sec, frequency = 10 MHz).

Figure 17:
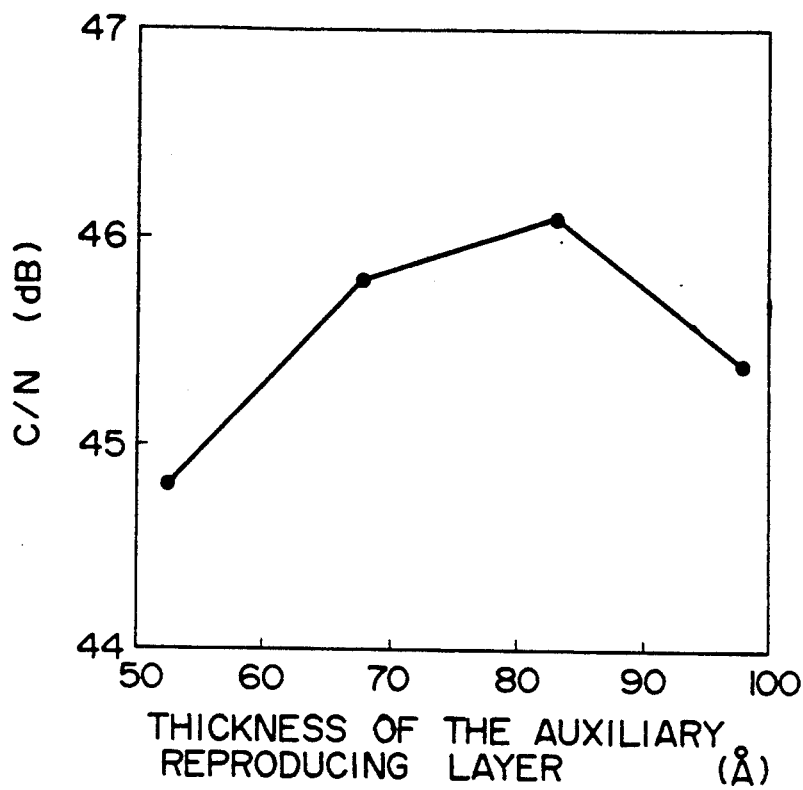
FIG. 17 is a graph showing the variation of C/N with the thickness of the auxiliary reproducing layer of a four-layer magneto-optic recording medium.

FIG. 17 is a graph showing the variation of C/N with the thickness $h_{2a}$ of the auxiliary reproducing layer 400a. As is obvious from FIG. 17, C/N is 44 dB or higher for the thickness $h_{2a}$ in the range of 50 to 100 Å.

Figure 18:
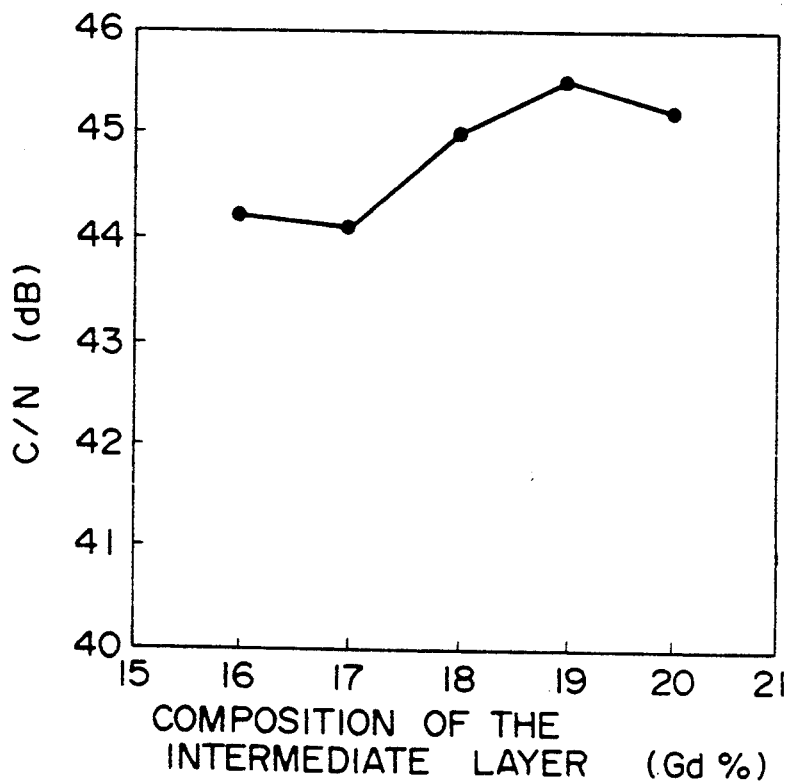
FIG. 18 is a graph showing the variation of C/N with the composition of the intermediate layer of a four-layer magneto-optic recording medium.

FIG. 18 is a graph showing the variation of C/N with the Gd content of the intermediate layer 400b, and FIG. 19 is a graph showing the variation of C/N with the Tb content of the auxiliary reproducing layer 400a. As is obvious from FIGS. 18 and 19, C/N is satisfactory.

FIG. 20 shows the frequency characteristic of C/N. As is obvious from FIG. 20, the value of C/N in the high-frequency band indicated by a curve A in FIG. 20 in reproducing information signals by the signal reproducing method in the second embodiment, i.e., a signal reproducing method of a two-mask system, as compared with that of C/N indicated by a curve B in FIG. 20 in reproducing information signals by a signal reproducing method of a single-mask system which reads information signal by simply transferring the magnetic signals recorded in the record hold layer to the reproducing layer.

When the intermediate layer is a rare earth metal-rich (RE-rich) film, the films of the layers were formed in thickness and coercive force as follows:

$h_1 = 300$ Å

$h_{2a} = 50$ to $110$ Å

$(H_{c1}, H_{c2a})_{AVG} = 0.9$ to $4$ kOe $h_{2b} = 200$ Å

$H_{c2b} < 1$ kOe (RE-rich)

$h_3 = 450$ Å

$H_{c3} = 7$ kOe (TM-rich) to $10$ kOe (RE-rich)

Film forming conditions for forming the RE-rich intermediate layer are somewhat more strict than those for forming the TM-rich intermediate layer.

After initializing the magneto-optic recording medium by applying an initializing magnetic field $H_{ini} = 4$ kOe, a reproducing magnetic field $H_{read} = 20$ to 600 Oe was applied to the magneto-optic recording medium and the magneto-optic recording medium was irradiated with a laser beam of 3 mW in reproducing power on the surface of the magneto-optic recording medium to reproduce information signals. A sufficiently large C/N was obtained for a bit period of 0.8 μm (linear speed = 8 m/sec, frequency = 10 MHz).

As is apparent from the foregoing description, according to the present invention the magneto-optic recording medium is heated with a reproducing laser beam in a temperature distribution so that a region remaining in the initialized state, a region to which the information is transferred from the record hold layer, and a region magnetized in the same direction as that of the reproducing magnetic field are formed in the field of the lens. Accordingly, a portion of the magneto-optic recording medium within the field of the lens can be set in a state equivalent to an optically masked state, which enables track recording density and track density to be improved greatly. Furthermore, the region to which the information is transferred from the record hold layer is neither expanded nor reduced, even if the reproducing power varies, and frequency characteristics during reproducing operation are satisfactory.

Third Embodiment

Figure 21A:
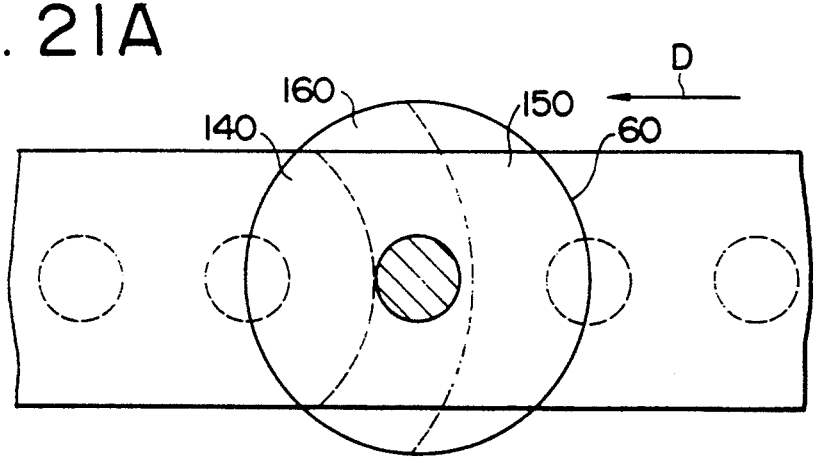
Figure 21B:
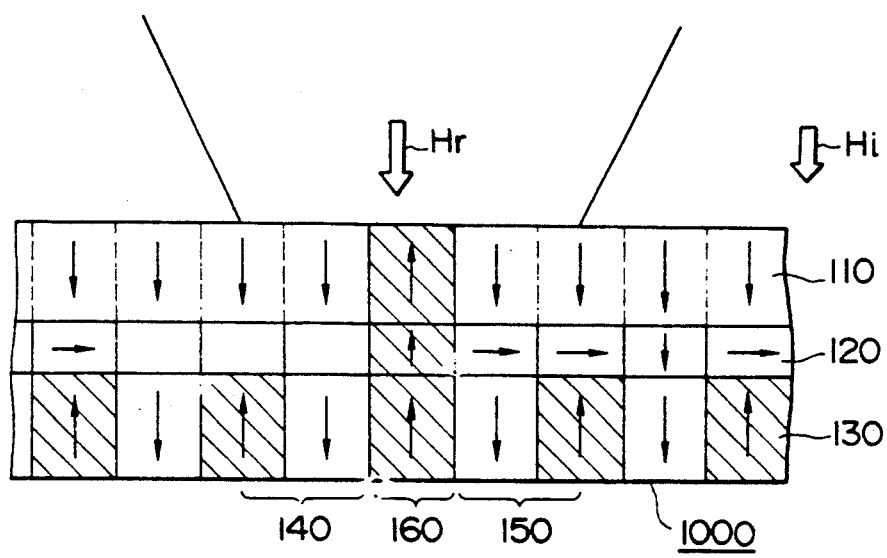
Figure 21C:
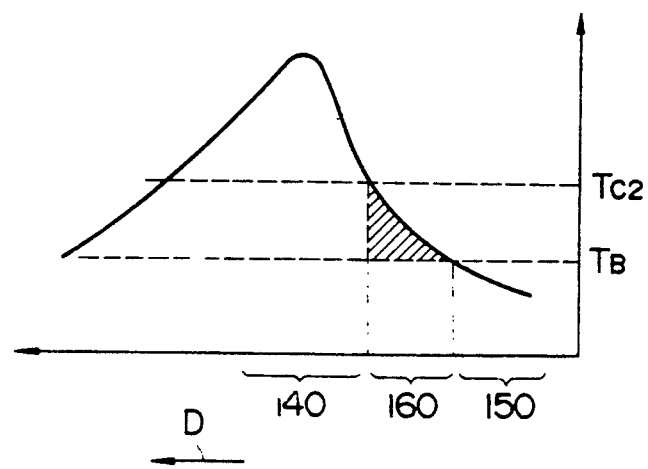

The magneto-optic recording/reproducing system in accordance with the third embodiment of the present invention utilizes the temperature distribution in a portion irradiated with the reading light beam of the magneto-optic recording medium 1000. When the magneto-optic recording medium 1000 moves in the direction of an arrow D shown in FIG. 21A, the temperature of an area on the magneto-optic recording medium 1000 starts rising immediately before the area comes into the spot 60 of the reading light beam. The area in the spot 60 is heated to provide a temperature distribution as shown in FIG. 21C, in which a region of the area slightly before the center of the spot 60 where the intensity of the light beam is the highest is heated to the highest temperature owing to heat conduction. The magneto-optic recording/reproducing system in accordance with the present invention magnetizes the reproducing layer 110 in a direction for information reproducing, heats the magneto-optic recording medium 1000 so that the high-temperature region 140 is heated to a temperature not lower than the Curie temperature $T_{c2}$ of the intermediate layer 120, and heats the low-temperature region 160 to a temperature lower than the Curie temperature $T_{c2}$ of the intermediate layer 120 so that the expression in Mathematical 1 is satisfied. Consequently, in the high-temperature region on the magneto-optic recording medium 1000, the intermediate layer 120 is demagnetized, and the direction of magnetization of the reproducing layer 110 is turned in the direction of the reproducing magnetic field $H_r$, regardless of the magnetization of the recording layer 130. In the reproducible region 160, the magnetization of the recording layer 130 is transferred to the reproducing layer 110 against the reproducing magnetic field $H_r$ to meet the expression in Mathematical 1. Thus, the direction of magnetization of a region heated at a temperature lower than that at which the reproducible region 160 is heated and not meeting the expression in Mathematical 1 remains in the direction of initial magnetization, which is the same as the direction of the reproducing magnetic field $H_r$.

Accordingly, the area corresponding to the spot 60 of the reading light beam on the magneto-optic recording medium 1000, the direction of magnetization of the reproducing layer 110 other than the reproducible region 160, is turned in the direction of the reproducing magnetic field $H_r$, and only a recording bit 4 in the recording layer 130 corresponding to the reproducible region 160 is transferred to the reproducing layer 110 so that binary values "1" and "0" can be read.

A magneto-optic recording/reproducing system in a preferred embodiment according to the present invention will be described hereinafter with reference to FIGS. 21 to 25. The magneto-optic recording/reproducing system employs a four-layer magneto-optic recording medium 1000 (FIG. 22) having a magnetic layer consisting of a reproducing layer 11 an auxiliary layer 120a, an intermediate layer 120b, and a recording layer 130. The reproducing layer 110 and the auxiliary layer 120a, which contribute to reproducing, are formed so that the coercive force $H_{CA}$ has desired temperature characteristics. The auxiliary layer 120a is formed of a material having a comparatively low Curie temperature.

Figure 22:
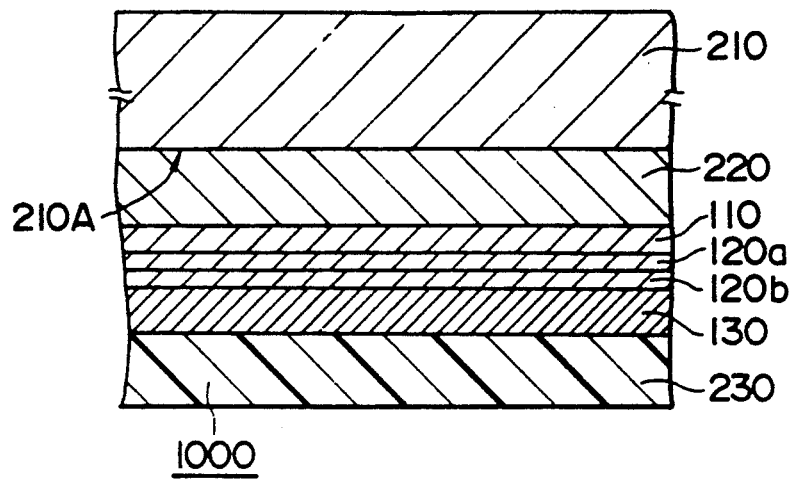
FIG. 22 is an enlarged schematic sectional view of a magneto-optic recording medium employed in carrying out the third embodiment of the present invention.
Figure 23:
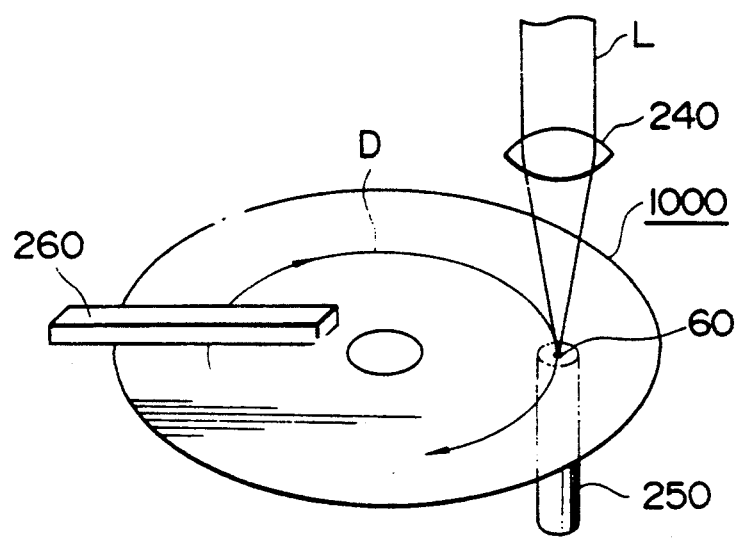
FIG. 23 is a schematic perspective view for assistance in explaining the magneto-optic recording/reproducing system in accordance with the third embodiment of the present invention.

The magneto-optic recording medium 1000 has a construction as shown in an enlarged schematic sectional view in FIG. 22. As shown in FIG. 22, a dielectric film 220, such as a SiN film, is formed over a major surface 210A of a transparent substrate 210 of polycarbonate (PC) or the like in a thickness of, for example, 800 Å by sputtering or the like. GdFeCoAl film, for example a $Gd_{23}(Fe_{85}Co_{15})_{77}$ film of 300 Å in thickness, is formed as the reproducing layer 110. A TbFeCoAl film, for example a $Tb_{12}(Fe_{95}Co_5)_{83}Al_5$ of 80 Å in thickness, is formed as the auxiliary layer 120a. A GdFeCo film, for example a $Gd_{20}(Fe_{95}Co_5)_{80}$ of 150 Å in thickness, is formed as the intermediate layer 120. A TbFeCo film, for example a $Tb_{25}(Fe_{85}Co_{15})_{75}$ of 450 Å in thickness, is formed as the recording layer 130 by continuous sputtering or the like. The layers 110, 120a, 120 and 130 are coated with a surface protective film 230 formed of SiN or the like in a thickness of 800 Å by sputtering or the like.

The reproducing layer 110, the auxiliary layer 120a, the intermediate layer 120b, and the recording layer 130 have Curie temperatures and coercive forces tabulated in Table 1.

TABLE 1

| | Curie temperature | Coercive force |
|---|---|---|
| Reproducing layer | Lower than 300° C. | 1 to 4 kOe in average |
| Auxiliary layer | 160° C. | |
| Intermediate layer | 250° C. | 100 Oe |
| Recording layer | 230° C. | Smaller than 10 kOe |

The magneto-optic recording/reproducing system employing the magneto-optic recording medium 1000 thus constructed will be described hereinafter. As shown in a schematic perspective view in FIG. 23, an optical system including an objective lens 240 for focusing, for example a laser beam, is disposed so as to irradiate the surface of the magneto-optic recording medium 1000 on the side of the substrate 210 to irradiate the upper surface of the magneto-optic recording medium 1000 with a reading light beam L. A reproducing magnet 250 is provided for applying a reproducing magnetic field $H_r$ to the magneto-optic recording medium 1000. It is disposed directly below the objective lens 240 on the opposite side of the magneto-optic recording medium 1000 with respect to the optical system. An initializing magnet 260 is disposed at a position before the track corresponding to the objective lens 240 and the reproducing magnet 250 with respect to the direction of movement of the magneto-optic recording medium 1000, and is separated a sufficient distance from the reproducing magnet 250 so that the initializing magnet 260 may not affect the reproducing magnetic field $H_r$. The polarity of the magnetic field created by the reproducing magnet 250 and that of the magnetic field created by the initializing magnet 260 are the same.

Figure 24A:
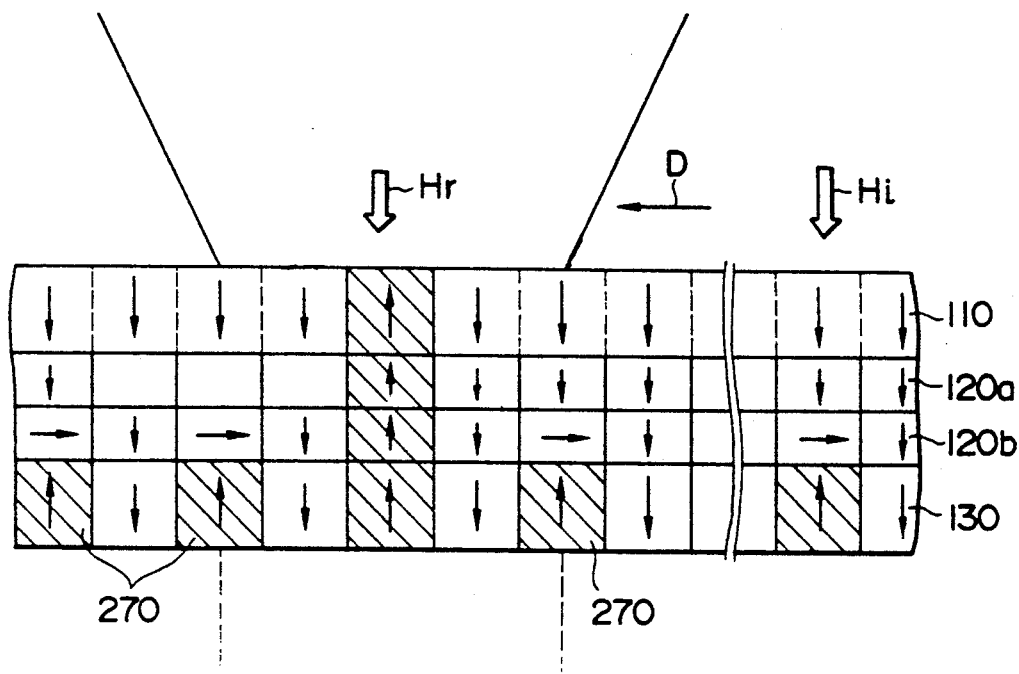
FIGS. 24A and 24B are views for assistance in explaining the magneto-optic recording/reproducing system in accordance with the third embodiment of the present invention.

When the layers have the foregoing coercive forces, and the initializing magnet field $H_i$ is in the range of 1 to 4 kOe, for example, 4 kOe, an expression in Mathematical 8 must be satisfied to turn the respective directions of magnetization of the reproducing layer 110 and the auxiliary layer 120a in the direction of the initializing magnetic field $H_i$ by the initializing magnet 260 as shown in FIG. 24A.

(Mathematical 8)

$$H_i > H_{CA} + \sigma_{w2}/2(M_{s1} \cdot h_i + M_{s2} \cdot h_{s2})$$

where $H_{CA}$ is the effective average coercive force of the coercive force $H_{c1}$ of the reproducing layer 110 and the coercive force $H_{cs}$ of the auxiliary layer 120a. $H_{CA}$ is expressed by:

$$H_{CA} = (M_{s1} \cdot h_1 \cdot H_{c1} + M_{ss} \cdot h_s \cdot H_{cs})/(M_{s1} \cdot h_1 + M_{ss} \cdot h_s)$$

where $M_{s1}$ and $M_{ss}$ are the saturation magnetizations of the reproducing layer 110 and the auxiliary layer 120a, respectively, and $h_1$ and $h_s$ are the values of thickness of the reproducing layer 110 and the auxiliary layer 120a, respectively. In the expression in Mathematical 8, $\sigma_{w2}$ is the domain wall energy of the intermediate layer 120b. The expression in Mathematical 8 corresponds to the expression in Mathematical 2 determining conditions for the aforesaid MSR system.

The recording layer 130 has a comparatively large coercive force and is capable of maintaining the direction of magnetization of the same determined during recording operation. To enable the recording layer 130 to maintain the direction of magnetization determined during recording operation, an expression in Mathematical 9 must be satisfied.

(Mathematical 9)

$$H_i < H_{c3} - \sigma_{w2}/2M_{s3} \cdot h_3$$

where $H_{c3}$, $M_{s3}$, and $h_3$ are the coercive force, saturation magnetization and thickness, respectively, of the recording layer 130. The conditions determined by the expression in Mathematical 9 correspond to those determined by the expression in Mathematical 3.

An expression in Mathematical 10 must be satisfied to hold the direction of magnetization of the recording layer 130, and the magnetization of the initialized reproducing layer 110 and the auxiliary layer 120a reverse to each other.

(Mathematical 10)

$$H_{CA} > \sigma_{w2}/2(M_{s1} \cdot h_1 + M_{ss} \cdot h_s)$$

The conditions determined by the expression in Mathematical 10 correspond to those determined by the expression in Mathematical 4.

Figure 24B:
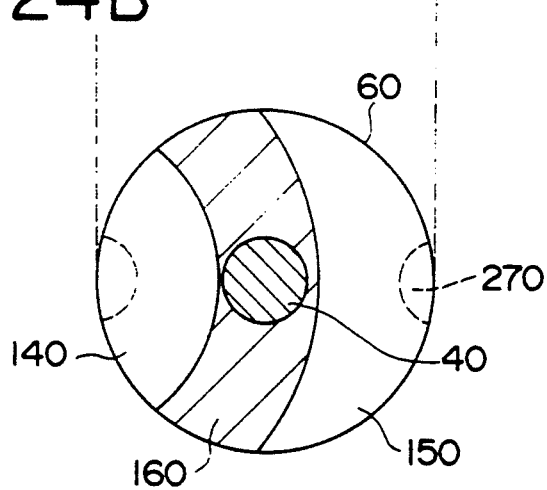

The reproducing magnetic field $H_r$ is applied to an area on the magneto-optic recording medium 1000 corresponding to the spot 60 of the reading light beam. When the magneto-optic recording medium 1000 moves in the direction of an arrow D as shown in FIG. 24A, the temperature of the area on the magneto-optic recording medium 1000 rises gradually in the spot 60, and the area is heated to a temperature distribution in which the temperature of a region slightly ahead of the center of the spot 60 is the highest and the temperature decreases toward the opposite sides of the peak. As shown in FIG. 24B, a high-temperature region 140 heated at a temperature not lower than the Curie temperature $T_{c2}$ of the intermediate layer is biased to the left, as viewed in FIG. 24B, with respect to the center of the spot 60. Therefore, the auxiliary layer 120a having a Curie temperature of 140° C. is demagnetized. Consequently, the direction of magnetization of a region of the reproducing layer 110 in the high-temperature region 140 is turned in the direction of the reproducing magnetic field $H_r$.

A reproducible region 160 heated at a temperature lower than that of the high-temperature region 140 is formed in the shape of a circular arc between the high-temperature region 140 and a low-temperature region 150. As indicated by a shaded area in FIG. 21C, the temperature of the reproducible region 160 is lower than the Curie temperature $T_{c2}$ of the auxiliary layer 120a and not lower than a predetermined temperature $T_B$. The reproducible region 160 satisfies an equality: $H_r + H_{CA} < H_{w1} \cdot H_{CA}$ defined by the expression in Mathematical 6.

When the magnetic field $H_{w1}$ created by the magnetic domain wall formed between the auxiliary layer 120a and the intermediate layer 120b is greater than the sum of the reproducing magnetic field $H_r$ and the average coercive force $H_{CA}$ of the reproducing layer 110 and the auxiliary layer 120a, the respective directions of magnetization of the reproducing layer 110 and the auxiliary layer 120a are turned in the direction of magnetization of the recording layer 130 against the reproducing magnetic field $H_r$. That is, the direction of magnetization of the recording layer 130 reverse to the direction of the reproducing magnetic field $H_r$ is transferred to the reproducing layer 110.

The low-temperature region 150 in the spot 60 and which is heated at a temperature lower than that of the reproducible region 160, namely heated at a temperature lower than the predetermined temperature $T_B$, has a crescent shape. Since the low-temperature region 150 does not satisfy the expression in Mathematical 1, the direction of magnetization of the reproducing layer 110 in the low-temperature region remains in the direction of the initializing magnetic field $H_i$, which is the same as that of magnetization of the reproducing layer 110 in the high-temperature region 140. Accordingly, the recording bits in the high-temperature region 140 and the low temperature region 150 in the spot 60 are not transferred to the reproducing layer 110, and are held in latent recording bits 270 in the recording layer 130 as shown in FIGS. 24A and 24B. Only the recording bit 40 in the narrow reproducible region 160 is transferred to the reproducing layer 110 Since the reproducing layer 160 is a narrow region between the high-temperature region 140 and the low-temperature region 150, high-density recorded information can be reproduced at a high resolution.

Figure 25:
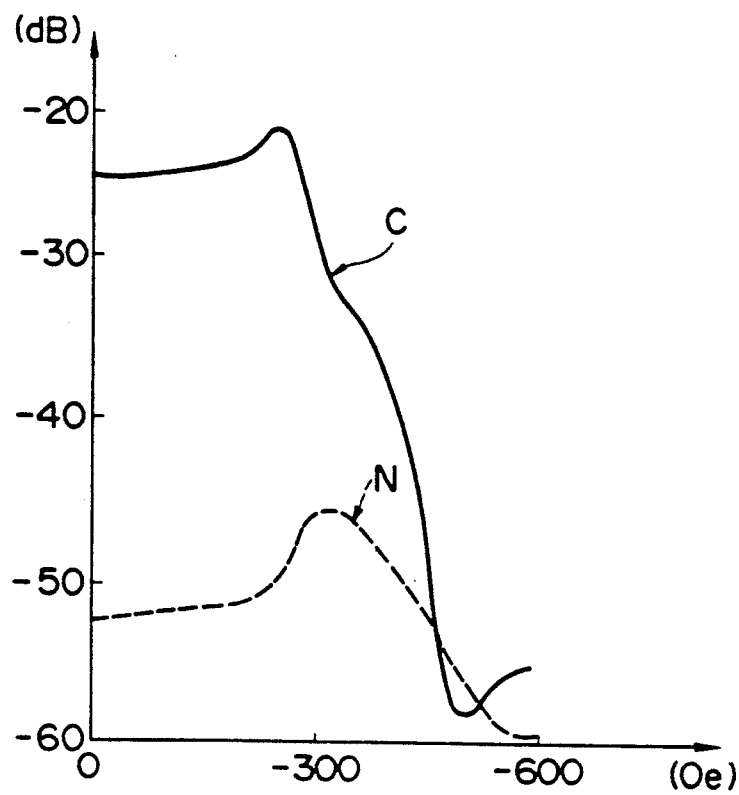
FIG. 25 is a graph showing the output characteristics of a magneto-optic recording medium by the magneto-optic recording/reproducing system in accordance with the third embodiment of the present invention.

FIG. 25 shows measured output characteristics when the four-layer magneto-optic recording medium 1000 was rotated at 2400 rpm, an initializing magnetic field of 4 kOe was applied to the magneto-optic recording medium 1000, the magneto-optic recording medium 1000 was irradiated with a reading light beam L of 3.3 mW in power, and a signal of 10 MHz recorded on a track at a distance r of 30 mm from the center of the magneto-optic recording medium 1000 was reproduced. In FIG. 25, a continuous curve C indicates the output signal, and a broken curve N indicates output noise. The average coercive force $H_{CA}$ of the reproducing layer 110 and the auxiliary layer 120a was 4 kOe, the coercive force of the intermediate layer 120b was 1 kOe, and the coercive force of the recording layer 130 was 15 kOe. As is obvious from FIG. 25, the magneto-optic recording/reproducing system in accordance with the present invention is capable of reproducing a high-frequency signal of a frequency as high as 10 MHz at a satisfactory C/N ratio and at a high resolution by using a reproducing magnetic field $H_r$ on the order of 300 Oe or below at which the difference between the curve C and the curve N is large.

In this embodiment, the initializing magnet 260 is disposed before a position where the signals recorded on the magneto-optic recording medium 1000 are read with respect to the direction of movement of the magneto-optic recording medium 1000. It is also possible to omit the initializing magnet 260 and to turn the direction of magnetization of the reproducing layer 110 in the direction of the reproducing magnetic field $H_r$ immediately after recording, or immediately before reproducing by applying a magnetic field of the same direction and the same intensity as those of the reproducing magnetic field $H_r$ to the magneto-optic recording medium 1000 with the reproducing magnet 250 for reading information in a high resolution.

The present invention is applicable to magneto-optic recording media of various constructions other than that of the foregoing magneto-optic recording medium 1000. For example, the present invention is applicable to a three-layer magneto-optic recording medium having a reproducing layer 110 of $Gd_{24}(Fe_{85}Co_{15})_{76}$, an intermediate layer 120 of $Tb_{18}Fe_{82}$ and a recording layer 130 of $Tb_{25}(Fe_{85}Co_{15})_{75}$, and not provided with the auxiliary layer 120a. When such a magneto-optic recording medium is employed, the coercive force $H_{CA}$ of the layers contributing to reproducing in the expression in Mathematical 1 is substituted by coercive force $H_{c1}$, and the coercive force, thickness, magnetization and domain wall energy of each layer are determined selectively so that the expressions in Mathematical 2, Mathematical 3 and Mathematical 4 instead of those in Mathematical 6, Mathematical 9 and Mathematical 10 are satisfied. When conditions defined by those expressions are satisfied, information recorded in the three-layer magneto-optic recording medium can be reproduced at a high resolution.

As is apparent from the foregoing description, since the magneto-optic recording/reproducing system in accordance with the present invention reproduced information from the narrow reproducible region 160 between the high-temperature region 140 and the low-temperature region 150 in the spot 60 of the reproducing light beam, and the reproducible region 160 is narrower than that in the MSR system, the magneto-optic recording/reproducing system in accordance with the present invention is capable of surely reading information from a magneto-optic recording medium 1000 having recording bits 40 in the spot 60 of the reading light beam in a higher density. Furthermore, even if the area of the spot 60 is increased by increasing the power of the reproducing laser beam to increase the reproducing output, the magneto-optic recording/reproducing system is able to reproduce the information in a sufficiently high resolution higher than the resolution of the conventional reproducing system, and hence the magneto-optic recording/reproducing system improves C/N (S/N).

Still further, the device for carrying out the magneto-optic recording/reproducing system can be simplified by omitting the initializing magnetic field creating means and turning the direction of magnetization of the reproducing layer in one direction immediately before reproducing by the reproducing magnetic field creating means.

Fourth Embodiment

As shown in FIG. 27A, when the magneto-optic recording medium in accordance with the fourth embodiment of the present invention moves in the direction of an arrow D, namely from right to left as viewed in FIG. 27A, the magneto-optic recording medium is heated with a laser beam so that an area in the spot 115 of the laser beam is heated in a temperature distribution as shown in FIG. 27B, in which the temperature of the front portion of the magneto-optic recording medium 1110 with respect to the direction of movement thereof relative to the spot 115 indicated by the arrow D is the highest because the duration of irradiation of the front portion with the spot 115 is the longest.

The temperature decreases from the high-temperature region toward the back portion with respect to the direction of movement indicated by the arrow D.

In reading recording bits formed in the magneto-optic recording medium 1110 in accordance with the fourth embodiment of the present invention, a first heated region I heated at a temperature nearly equal to the Curie temperature $T_{cs}$ of the auxiliary reproducing layer 131, i.e. a temperature higher than the compensation temperature $T_{comp}$ of the reproducing layer 111. A second heated region II is heated at a predetermined temperature $T_{a+}$ at which the coercive force $H_{c1}$ of the reproducing layer 111 is reduced below the exchange force between the reproducing layer 111 and the recording layer 113. This is lower than the temperature of the first heated region I. A third heated region III is heated at a temperature lower than the temperature of the second heated region II. The regions differ from each other in function. These regions are formed in an area corresponding to the spot 115 of the reading laser beam as shown in FIGS. 27A and 27B. Only the latent recording bits in the recording layer 113 in a region corresponding to the narrow second heated region II are transferred to the reproducing layer for reading.

A magneto-optic recording medium 1110 has a magneto-optic recording layer consisting of a reproducing layer 111, an auxiliary reproducing layer 131, an intermediate layer 112 and a recording layer 113, which are coupled magnetically.

The reproducing layer 111, the auxiliary reproducing layer 131, the intermediate layer 112 and the recording layer 113 are formed sequentially in that order by continuous sputtering on a transparent dielectric layer 123, for example, a SiN film having a thickness of 800 Å, that serves as a protective layer or an interference layer formed on a transparent substrate 1200 of glass, an acrylic or polycarbonate. A protective film 125 of a non-magnetic metal or a dielectric material, for example, a SiN film having a thickness of 800 Å, is formed over the recording layer 113.

At least the reproducing layer 111, and preferably each of the auxiliary reproducing layer 131, the intermediate layer 112, and the recording layer 113 in addition to the reproducing layer, are ferrimagnetic films of a rare earth metal-transition metal in which the magnetic moment of a rare earth metal (RE) and that of a transition metal (TM) are anti-ferromagnetically coupled.

The reproducing layer 111 and the auxiliary reproducing layer 131 are films in which a rare earth metal sublattice is dominant (hereinafter referred to as "RE-rich films") at an ordinary temperature.

The intermediate layer 112 and the recording layer 113 may be a transition metal sublattice dominant film (hereinafter referred to as "TM-rich films") or RE-rich films at an ordinary temperature.

The reproducing layer 111 and the auxiliary reproducing layer 131 formed so that the coercive force $H_{CA}$ defined by the expression in Mathematical 5 is in the range of 0.9 to 5 kOe when the intermediate layer 112 is a RE-rich film, or in the range of 1 to 4 kOe when the intermediate layer 112 is a TM-rich film.

The reproducing layer 111 is a layer that contributes substantially to reading recorded information, namely to the magneto-optic effect (Kerr effect) in connection with the reading light. The reproducing layer 111 is formed of a material having a large angle of Kerr rotation, such as a perpendicularly magnetizable GdFeCo film having a Curie temperature $T_{c1}$ of 300° C. or higher and a compensation temperature $T_{comp}$ on the order of 100° C., for example a $Gd_{25}(Fe_{85}Co_{15})_{75}$ film of 300 Å in thickness.

The auxiliary reproducing layer 131 is a perpendicularly magnetizable film having a Curie temperature $T_{cs}$ about equal to the compensation temperature $T_{comp}$ of the reproducing layer 111, for example, on the order of 100° C., and is for example, a $Tb_{44}(Fe_{95}Co_5)_{56}$ film of a thickness in the range of 50 Å to 110 Å.

The intermediate layer 112 is a perpendicularly magnetizable film of a comparatively small perpendicular anisotropy having a coercive force $H_3$, for example, smaller than 1.0 kOe and a Curie temperature $T_{c2}$ of about 250° C., for example, a $Gd_{19}(Fe_{95}Co_5)_{81}$ film of 100 Å in thickness.

The intermediate layer 112 may be a Re-rich film at an ordinary temperature, for example of $Gd_{28}(Fe_{95}Co_5)_{72}$.

The recording layer 113 may be a film having a thickness of 100 Å, a Curie temperature $T_{c3}$ of about 250° C., and a coercive force $H_3$ of 17 kOe, for example a TM-rich film perpendicularly magnetizable at an ordinary temperature of $Tb_{22}(Fe_{85}Co_{15})_{78}$ or a RE-rich film of $Tb_{25}(Fe_{85}Co_{15})_{75}$ perpendicularly magnetizable at an ordinary temperature.

Information is recorded, namely recording bits 141 are formed, at least in the recording layer 113 of the magneto-optic recording medium 1110 in accordance with the present invention by, for example, a magnetic field modulation system.

Figure 26:
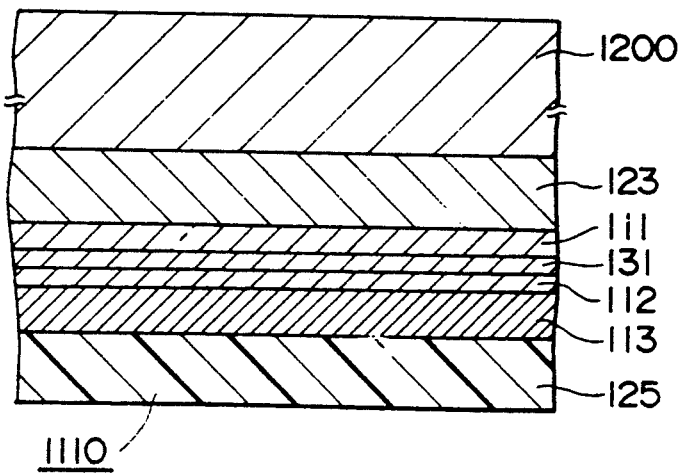
FIG. 26 is a diagrammatic sectional view of a magneto-optic recording medium in a fourth embodiment according to the present invention.
Figure 28:
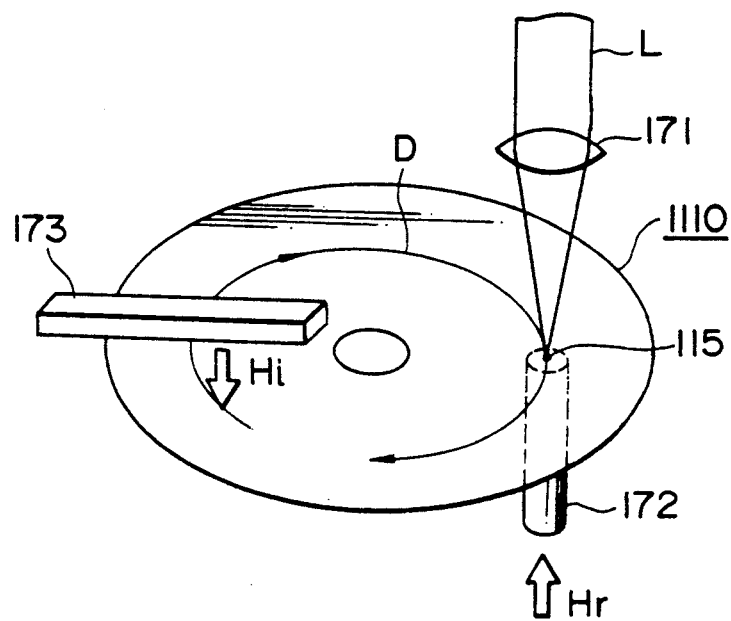
FIG. 28 is a perspective view of a reproducing system for reproducing information from a magneto-optic recording medium in accordance with the present invention.

In reading information from the magneto-optic recording medium 1110, for example a magneto-optic disk having the recording layer 113 in which the information is recorded in recording bits 141, a light beam such as a linearly polarized laser beam L of 780 nm in wavelength is emitted by a semiconductor laser, and is focused on the magneto-optic recording medium 1110 rotating in the direction of an arrow D on the side of the substrate 1200 described previously with reference to FIG. 26 by an objective lens 171 as shown in FIG. 28.

The difference of the recording bit 141 from other regions in the rotation of the plane of polarization by the Kerr effect of the reproducing layer 111 is detected to read the information recorded in the recording bit 141.

A reproducing magnetic field applying means 172 is disposed near the spot 115 of the laser beam L on the magneto-optic recording medium 1110. The reproducing magnetic field applying means 172 applies a unidirectional reproducing magnetic field $H_r$ perpendicularly to the surface of the magneto-optic recording medium 1110.

An initializing magnetic field applying means 173 applies a unidirectional initializing magnetic field $H_i$ of a polarity reverse to that of the reproducing magnetic field $H_r$ to a region of the magneto-optic recording medium 1110 before the region comes into the spot of the laser beam L.

The reproducing function of the magneto-optic recording medium 1110 having the reproducing layer 111 and the auxiliary reproducing layer 131, which are RE-rich films at an ordinary temperature, and the intermediate layer 112 and the recording layer 113, which are TM-rich films at an ordinary temperature, will be described with reference to FIGS. 29A, 29B, 29C, and 29D.

Figure 29A:
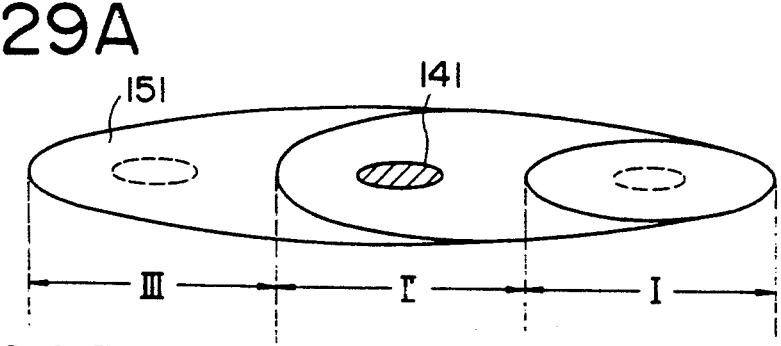
FIGS. 29A and 29B are diagrammatic views for assistance in explaining a manner of reproducing information from a magneto-optic recording medium in accordance with the fourth embodiment of the present invention.

FIG. 29A shows heated regions I, II and III, such as those described with reference to FIG. 27, formed on the magneto-optic recording medium 1110 by irradiating the magneto-optic recording medium 1110 moving in the direction of an arrow D relative to the spot 151 with the laser beam.

The first heated region I is heated at a temperature higher than the compensation temperature $T_{comp}$ of the reproducing layer 111, the second heated region II is heated at a temperature $T_{a+}$ lower than the compensation temperature $T_{comp}$ and making the combined coercive force $H_{CA}$ of the reproducing layer 111 and the auxiliary reproducing layer 131 coincide substantially with the exchange force between the recording layer 113 and the reproducing layer 111 or between the recording layer 113 and the auxiliary reproducing layer 131, and the third heated region 111 is heated at a temperature lower than the temperature $T_{a+}$.

Figure 29B:
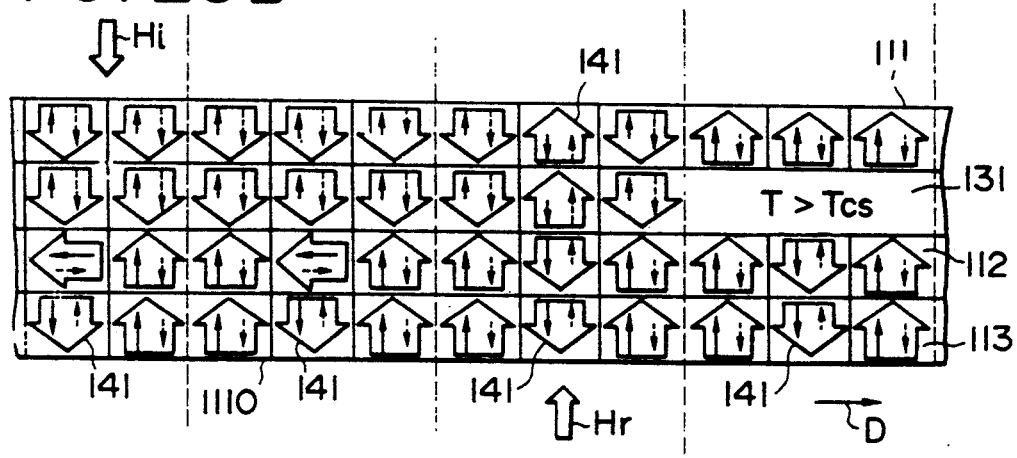
Figure 29C:
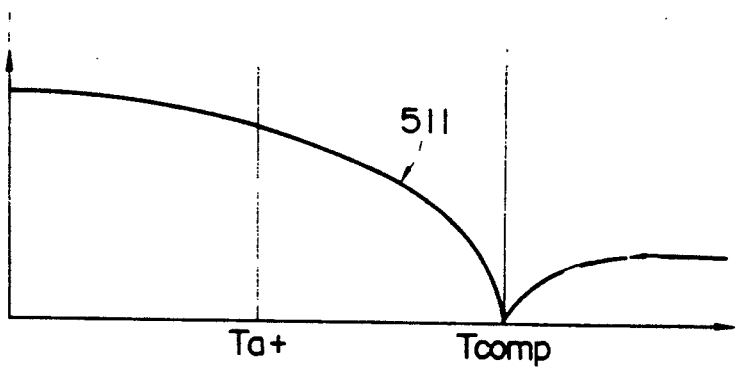
Figure 29D:
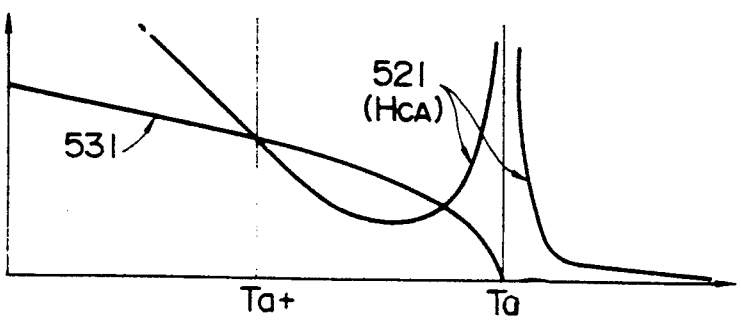

In FIGS. 29C and 29D, curves 511, 521, and 531 indicate the magnetization $M_{s1}$ of the reproducing layer 111, the coercive force $H_{CA}$, and the exchange force between the recording layer 113 and the reproducing layer 111 or between the recording layer and the auxiliary reproducing layer 131, respectively, in the heated regions I, II and III.

In FIGS. 29C and 29D, temperature is measured on the horizontal axes. Actually, the temperature does not vary in a linear temperature distribution in the third heated region III, the second heated region II and the first heated region I. However, the temperature is supposed to vary in a linear temperature distribution in FIGS. 29C and 29D to facilitate understanding.

The respective magnetic moments in the reproducing layer 111, the auxiliary reproducing layer 131, the intermediate layer 112 and the recording layer 113 are shown typically in FIG. 29B. In FIG. 29B, arrows of continuous lines indicate TM magnetic moments, arrows of broken lines indicate RE magnetic moments, and large blank arrows indicate general magnetic moments in the layers 111, 131, 112, and 113.

Suppose that recording bits 141 are formed in the recording layer 113 by magnetizing regions in the recording layer 113 so that the direction of the general magnetic moments in the regions is upward as shown in FIG. 29B.

As mentioned above, a laser beam L of 780 nm in wavelength is employed in reading the recording bits 141, namely, in reading out information. Since the transient metal contributes mainly to the Kerr effect in a wavelength range including the wavelength of the laser beam L, the signal obtained by detecting the angle of Kerr rotation is dependent on the direction of the TM magnetic moment indicated by the arrow of a continuous line in FIG. 29B; and the signal is dependent on the direction of the TM magnetic moment in the reproducing layer 111, particularly in this magneto-optic recording medium.

In reproducing information, the initializing magnetic field applying means 173 (FIG. 28) applies the initializing magnetic field $H_i$ of, for example, 4 kOe to the magneto-optic recording medium 1110 before the recording bits 141 (FIG. 29B) come into the spot 151 of the reading laser beam to turn the respective magnetic moments of the reproducing layer 111 and the auxiliary reproducing layer 131 indicated by blank arrows in FIG. 29B in the direction of the initializing magnetic field $H_i$, i.e., downward as viewed in FIG. 29B.

The power of the reading laser beam is, for example, 3 mW.

The reproducing magnetic field $H_r$, for example, in the range of 200 to 600 Oe of a direction reverse to that of the initializing magnetic field $H_i$, is applied to an area corresponding to the spot 151.

Since the coercive force $H_{c3}$ of the recording layer 113 is comparatively large, and conditions defined by the expressions in Mathematicals 1, 2, and 3 are satisfied by magnetic domain walls formed in the intermediate layer 112, the direction of magnetization of the recording layer 113 is not inverted and hence the recording bits 141 remain in the recording layer 113.

In this state, the recording bit 141 comes into the spot 151 of the reading laser beam. Since the exchange force is small as compared with the coercive force $H_{CA}$ in the third heated region III as shown in FIG. 29D, the recording bit 141 of the recording layer 113 is not transferred to the reproducing layer III and the auxiliary reproducing layer 131. Accordingly, the recording bit 141 is not read in the third heated region III.

Subsequently, the recording bit 141 enters the second heated region II, in which the coercive force $H_{CA}$ is smaller than the exchange force. Then, magnetic moment of the RE-rich reproducing layer 111 is turned upward, namely, the TM magnetic moment and the RE magnetic moment are turned in the direction of the TM magnetic moment and RE magnetic moment of the recording layer 113, by the reproducing magnetic field $H_r$ of an upward direction reverse to that of the initializing magnetic field $H_i$, and consequently a magnetic domain, i.e. the recording bit, emerges.

That is, the direction of the initialized TM moment causing Kerr rotation is inverted to enable reading out the recording bit 141 differing from other regions in Kerr rotation with the laser beam L.

When the recording bit 141 enters the first heated region I heated at a temperature $T_a$ higher than the Curie temperature $T_{cs}$ of the auxiliary reproducing layer 131 or the compensation temperature $T_{comp}$ of the reproducing layer 111, the TM magnetic moment of the TM-rich reproducing layer 111 having a small coercive force $H_{c1}$ is turned upward by the reproducing magnetic field $H_r$, and consequently the recording bit 141 in the reproducing layer 111 is extinguished and is unable to be read.

Thus, the heated regions I and III serve as a mask, and the second heated region II serves as a window through which the recording bit can be read in the area corresponding to the spot 151. Since the width of the window is far smaller than the diameter of the spot 151, the recording bit 141 can be read even if the recording bit 141 is smaller than the diameter of the spot 151.

The width of the window determining the resolution can be reduced independently of the wavelength $\lambda$ and the numerical aperture N.A. defining the diameter of the spot 151.

It was confirmed through the measurement of a Kerr loop that the conditions shown in FIG. 29D were satisfied.

Figure 30:
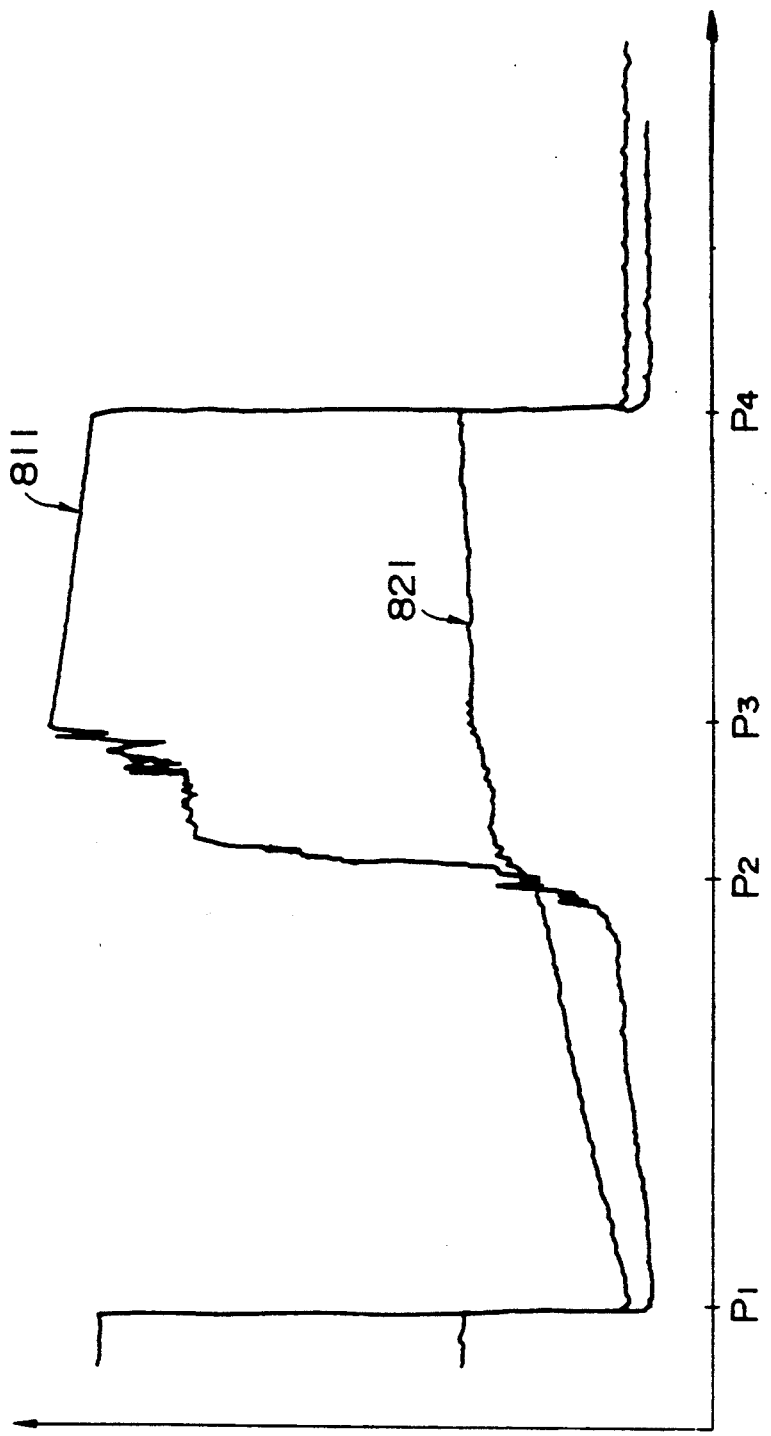
FIG. 30 is a graph showing the variation of measured output with the power of the reproducing beam.

FIG. 30 shows the measured variation of reproduced output signals reproduced from the magneto-optic disk thus constructed with the power of the reproducing laser beam L. In FIG. 30, curves 811 and 821 indicate carrier level and noise level, respectively. The carrier level varies stepwise with the power of the reproducing laser beam L. In the power range of $P_1$ to $P_2$, the temperature of an area corresponding to the spot of the laser beam L is comparatively low and hence the MSR effect is not produced, namely, no window is formed in the area corresponding to the spot of the laser beam L. In the power range of $P_2$ and $P_3$, a window is formed in the high-temperature region on one side of the area corresponding to the spot. In the power range of $P_3$ to $P_4$, a window (the second heated region II) is formed in the narrow central region of the area corresponding to the spot between the first heated region I and the third heated region III serving as a mask.

In obtaining the measured results shown in FIG. 30, a carrier of 10 MHz was measured by rotating a magneto-optic disk of 32 mm in radius at 2400 rpm, irradiating the magneto-optic disk with a laser beam of 19 mW for 15 msec, and applying a reproducing magnetic field $H_r$ of about 600 Oe to the magneto-optic disk.

When the period of the recording bits on the magneto-optic recording medium (the magneto-optic disk) was 0.8 μm, C/N was 35 dB or above.

Figure 31:
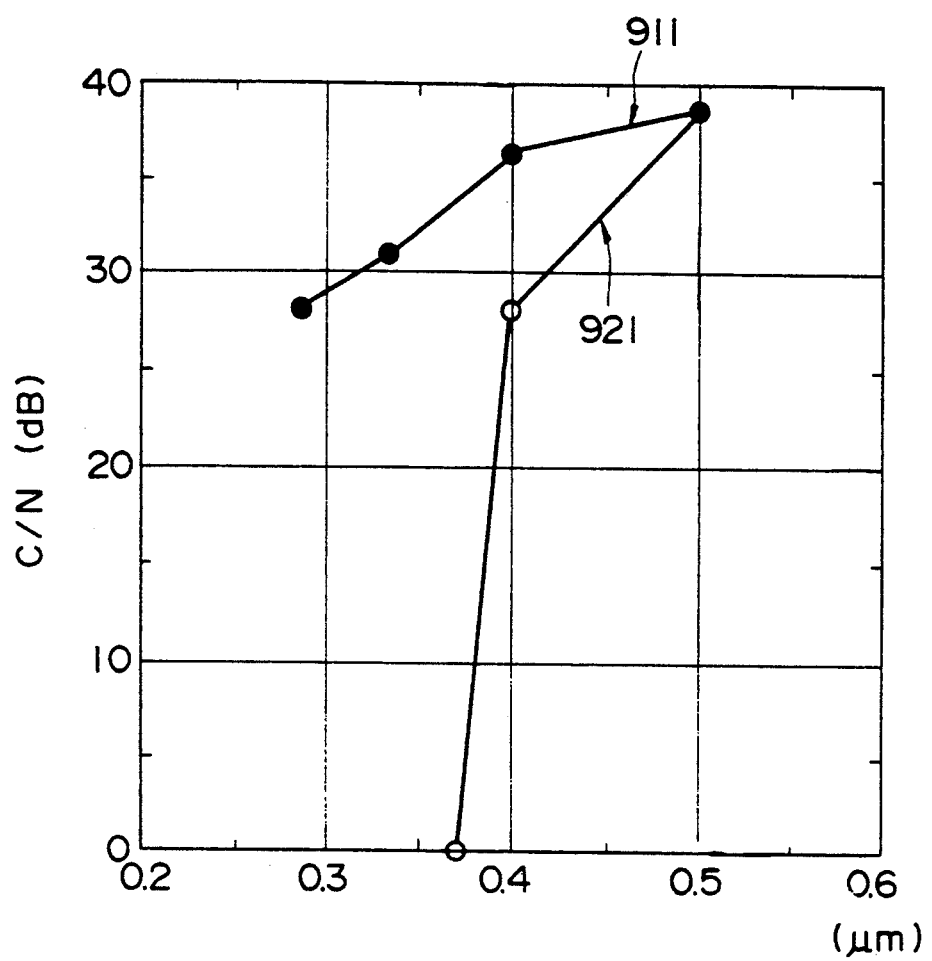
FIG. 31 is a graph showing the measured relation between bit length and C/N.

In FIG. 31, a curve 91 indicates measured C/N, and a curve 92 indicates the C/N in reproducing information by a conventional magneto-optic recording/reproducing system other than the MSR system. As is obvious from FIG. 31, the present invention improved C/N remarkably in a bit length range below 0.35 μm, which proved the effect of the present invention on the enhancement of resolution.

Although the intermediate layer 112 and the recording layer 113 employed in the foregoing embodiment are TM-rich films at an ordinary temperature, the same effect can be expected when the intermediate layer 112 and the recording layer 113 are RE-rich films.

The magneto-optic recording medium 1110 having the four-layer magneto-optic recording layer consisting of the reproducing layer 111, the auxiliary reproducing layer 131, the intermediate layer 112 and the recording layer 113, employed in the foregoing embodiment has an advantage that characteristics meeting the conditions necessary for the operating function can easily be obtained.

Figure 32A:
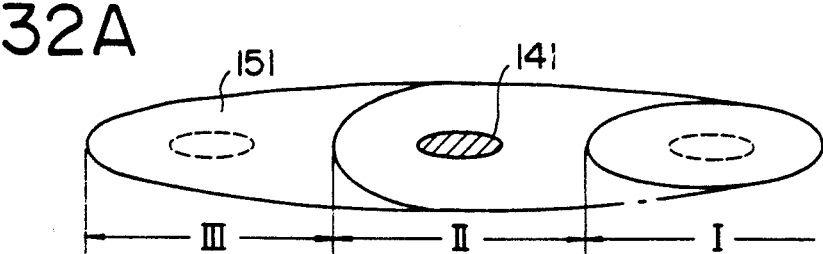
FIGS. 32A to 32D are diagrammatic views for assistance in explaining a manner of reproducing information from a magneto-optic recording medium in accordance with the fourth embodiment of the present invention.
Figure 32B:
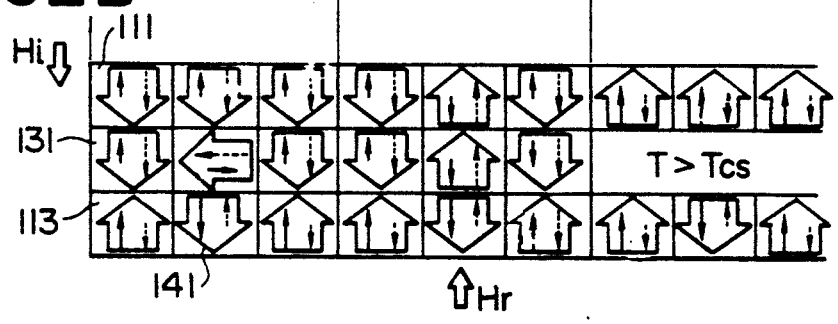
Figure 32C:
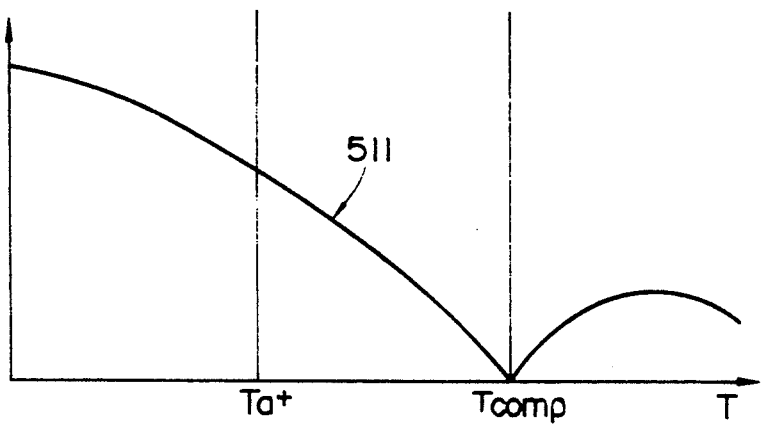
Figure 32D:
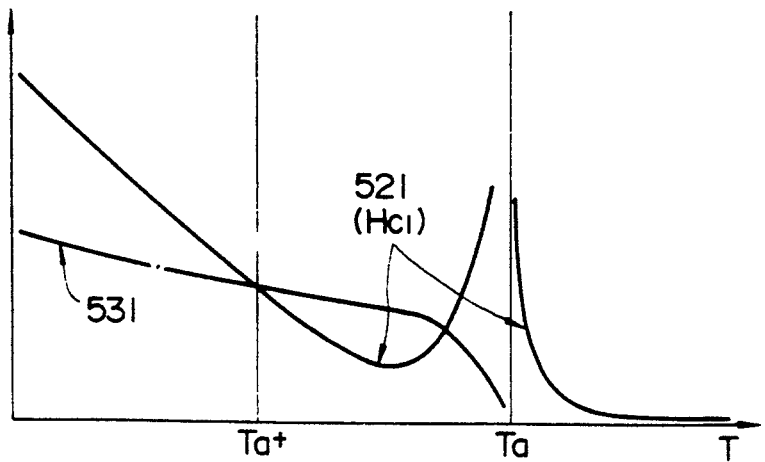

However, the magneto-optic recording layer may be of a three-layer construction consisting of a reproducing layer 111, an auxiliary reproducing layer 131 having the function of the intermediate layer 112, and a recording layer 113 as shown in FIG. 32B.

Information can be reproduced from a magneto-optic recording medium having such a magneto-optic recording layer of a three-layer construction by the same reproducing operation as that described with reference to FIGS. 29A to 29D. In FIGS. 32A to 32D, parts corresponding to those shown in FIGS. 29A to 29D are denoted by the same reference characters and the description thereof will be omitted to avoid duplication.

The reproducing layer 111 of the magneto-optic recording medium of a construction shown in FIG. 32B is formed of a ferrimagnetic material, such as a GdFeCo having a large angle of Kerr rotation, in which the RE magnetic moment and the TM magnetic moment are anti-ferromagnetically coupled. The reproducing layer 111 has a Re-rich composition having a compensation temperature $T_{comp}$ nearly equal to the Curie temperature $T_{cs}$ of the auxiliary reproducing layer 131 and a coercive force $H_{c1}$ not higher than, for example, 500 Oe.

The auxiliary reproducing layer 131 may be a Re-rich magnetic film at an ordinary temperature, such as a TbFe film having a perpendicular magnetic anisotropy necessary for controlling the shift of interfacial domain walls by an external magnetic field and having a high coercive force at an ordinary temperature. The combined coercive force $H_{CA}$ (the expression in Mathematical 5) of the reproducing layer 111 and the auxiliary reproducing layer 131 is about 2 kOe.

The Curie temperature $T_{cs}$ of the auxiliary reproducing layer 131 is lower than those of the other two layers, and the thickness of the same is, for example, 300 Å or above, which is greater than the thickness of the auxiliary reproducing layer of the four-layer magneto-optic recording layer.

The recording layer 113 is a TM-rich film or a RE-rich film, such as a TbFeCo film, having a coercive force $H_{c3}$ on the order of, for example, 10 kOe, a thickness of 450 Å and a Curie temperature of about 250° C.

As is apparent from the foregoing description, in reproducing the information recorded on the magneto-optic recording medium 1110 in accordance with the present invention, only the recording bit 141 within the narrow window formed in the second heated region II formed in an area corresponding to the spot of the reproducing laser beam between the regions serving as a mask, is reproduced so that the information can be reproduced in a very high resolution independent of the diameter of the spot of the laser beam, namely independent of the wavelength $\lambda$ of the laser beam and the numerical aperture N.A. of the objective lens.

Furthermore, since the window is formed by forming the reproducing layer 111 and the auxiliary reproducing layer 131 so that the compensation temperature of the former and the Curie temperature of the latter are substantially equal to each other, and by favorably utilizing the characteristics of the reproducing layer 111 and the auxiliary reproducing layer 131, the information can be surely and stably reproduced at a high resolution.

Although various minor changes and modifications might be proposed by those skilled in the art, it will be understood that we wish to include within the claims of the patent warranted hereon all such changes and modifications as reasonably come within our contribution to the art.

We claim as our invention:

1. A method of reproducing signals recorded on a magneto-optic recording medium, said recording medium being formed of at least a record hold layer and a reproducing layer, and wherein information to be reproduced is recorded in the record hold layer, comprising the steps of:
irradiating a spot of a laser beam on the recording medium with relative motion being provided such that the spot moves relative to the recording medium;
providing at least one external magnetic field to effect the recording medium for reproducing;
within an area of the spot of the laser beam, by use of said laser beam generating a temperature distribution in the recording medium, and wherein as a result of the temperature distribution creating within the spot a first region, second region, and third region with the second region lying between the first and third regions; and
transferring information recorded in the record hold layer to the reproducing layer for readout therefrom by magneto-optical effect with the laser beam, magnetic domains within the reproducing layer first region being all aligned in a first desired direction independently of magnetic domain signal patterns in the record hold layer, magnetic domains in the third region being aligned in a second desired direction independently of magnetic domain signal patterns in the record hold layer, and said first and third regions each acting as a mask at each side of the second region where readout occurs at high resolution.

2. A method according to claim 1 including the further steps of providing the temperature distribution such that the first region has a relatively high temperature, the second region has a relatively intermediate temperature lower than the high temperature, and the third region has a relatively low temperature lower than the intermediate temperature.

3. A method according to claim 1 including the further step of providing an external readout magnetic field within the area of the laser spot.

4. A method according to claim 1 including the further step of providing an initializing magnetic field outside the laser spot.

5. A method according to claim 1 including the further steps of providing an initializing magnetic field outside the laser spot, and providing a readout magnetic field at least within the area of the laser spot.

6. A method according to claim 1 including the further step of providing the first desired direction for magnetic domains in the first region opposite to the second desired direction of the magnetic domains in the third region.

7. A method according to claim 1 including the further step of providing the first desired direction of the magnetic domains in the first region to be the same direction as the second desired direction of the magnetic domains in the third region.

8. A method according to claim 1 including the further steps of providing the first and second desired directions of the magnetic domains in the first and third regions to be the same direction, providing a readout magnetic field at an area of the laser spot, and providing no separate initializing field.

9. A method according to claim 1 including the step of providing an intermediate layer between the record hold layer and the reproducing layer.

10. A method according to claim 9 including the further step of providing an auxiliary reproducing layer between the intermediate layer and the reproducing layer.

11. A method according to claim 1 including the steps of providing an auxiliary reproducing layer between the record hold layer and reproducing layer, and forming the reproducing layer of a ferrimagnetic material having a compensation temperature substantially equal to a Curie temperature of the auxiliary reproducing layer.

12. A method of reproducing signals recorded on a magneto-optic recording medium, the recording medium being formed of at least a record hold layer and a reproducing layer, and wherein information to be reproduced is recorded in the record hold layer, comprising the steps of:
irradiating a spot of a laser beam on the recording medium with relative motion being provided such that the spot moves relative to the recording medium; and
within an area of the spot of the laser beam by use of said laser beam generating a temperature distribution in the recording medium, and wherein as a result of the temperature distribution, creating within the spot a first region, a second region, and a third region with the second region lying between the first and third regions; and
reading out information recorded in the record hold layer in the second region, magnetic domains of the first and third regions being aligned so as to act as first and second masks lying to either sides of the second region, the magnetic domains of the first and third regions being independent of the information being read out in the second region.

13. A system for reproducing signals recorded on a magneto-optic recording medium, comprising:
recording medium being formed of at least a record hold layer and a reproducing layer, and wherein information to be reproduced is recorded in the record hold layer;
laser beam reproducing means for irradiating a spot on the recording medium with relative motion being provided such that the spot moves relative to the recording medium;
external magnetic field generating means for generating a magnetic field for use in reproducing the information recorded in the record hold layer; and
said recording medium having means for providing a temperature distribution within an area of the spot of the laser beam such that as a result of the temperature distribution, within the spot a first region, second region, and third region result with the second region lying between the first and third regions, and said reproducing layer at the second region having magnetic domains representing information recorded in the record hold layer and transferred to the reproducing layer, and magnetic domains of the first and second regions being aligned independently of magnetic domain signal patterns in the second region of the reproducing layer within the spot such that the first and third regions form masks at opposite sides of the second region.

14. A system according to claim 13 wherein said recording medium has an intermediate layer provided between the record hold layer and reproducing layer.

15. A method of reproducing signals recorded on a magneto-optic recording medium, comprising the steps of:
providing a recording layer formed of a multi-layer film having at least a reproducing layer, an intermediate layer, and a record hold layer which are coupled magnetically, said record hold layer having signals recorded therein in the form of a magnetic domain pattern;
initializing the reproducing layer by an initializing magnetic field to turn a direction of magnetization of the reproducing layer in an initial direction;
irradiating the reproducing layer with a laser beam to create therein within an area corresponding to a spot of the laser beam a temperature distribution such that magnetic domains in the reproducing layer in a third region of the spot maintain said initial direction, a second region has said magnetic domain pattern of the record hold layer transferred thereto, and a first region has magnetic domains of a same magnetic polarity which is independent of the magnetic domain pattern of the record hold layer; and
converting by magneto-optic effect magnetic signals recorded in the second region of the reproducing layer to which the magnetic domain pattern of the record hold layer has been transferred in order to read the magnetic signals.

16. A method according to claim 15 including the further step of positioning the second region between the first region and third region within the spot.

17. A method according to claim 15 including the step of applying a reproducing magnetic field Hr to the reproducing layer at the location where the laser beam spot is applied, and wherein said magnetic polarity of domains of the first region is the same as that of said reproducing magnetic field.

18. A method according to claim 15 including the step of making a direction of magnetization of domains of said first and third regions the same.

19. A method according to claim 17 including the steps of:
heating a portion of the intermediate layer within the laser spot to a temperature not lower than a Curie temperature of the intermediate layer; and
providing the reproducing layer such that $H_r + H_{ca} < H_{w1}$ where $H_{ca}$ is a coercive force of the reproducing layer, $H_r$ and $H_{w1}$ is a magnetic field created by a magnetic domain wall between the reproducing layer and the intermediate layer.

20. A method according to claim 19 including the further steps of providing an auxiliary reproducing layer between the intermediate layer and the reproducing layer, and providing $H_{CA}$ as a combined coercive force of the reproducing layer and auxiliary reproducing layer.

21. A method according to claim 15 including the further steps of providing an auxiliary reproducing layer between said reproducing layer and said record hold layer, said layers being magnetically coupled; and
forming said reproducing layer of a ferrimagnetic material having a compensation temperature substantially equal to a Curie temperature of the auxiliary reproducing layer.

22. A method of reproducing signals recorded on a magneto-optic recording medium formed of a multi-layer film comprising a reproducing layer, an intermediate layer, and a record hold layer which are coupled magnetically, said record hold layer having information recorded therein, comprising the steps of:
turning a direction of magnetization of the reproducing layer for initialization in a direction of an initializing magnetic field $H_{ini}$ meeting inequalities:

$$H_{ini} > H_{C1} + \sigma w_2/2M_{S1} \cdot h_1$$

$$H_{ini} < H_{C3} - \sigma w_2/2M_{S3} \cdot h_3$$

by applying the initializing magnetic field $H_{ini}$ to the magneto-optic recording medium, and wherein $H_{C1}$ is a coercive force, $H_1$ is a thickness, and $M_{S1}$ is a saturation magnetization of the reproducing layer, wherein $H_{C3}$ is a coercive force, $H_3$ is a thickness, and $M_{S3}$ is a saturation magnetization of the record hold layer, and wherein $\sigma w_{w2}$ is a domain wall energy of the magnetic domain wall between the reproducing layer and the record hold layer;
irradiating the reproducing layer with a spot of a laser beam to form a first region heated to a temperature not lower than a temperature $T_m$ and lower than a temperature $T_m'$, and heating a third region to a temperature not lower than the temperature $T_m'$ within the spot of the laser beam with application of a reproducing magnetic field $H_r$ to the magneto-optic recording medium; and
reproducing the information recorded in the record hold layer from the reproducing layer as an optical signal by magneto-optic effect.

23. A method of reproducing signals recorded on a magneto-optic recording medium according to claim 22 including the steps of forming said reproducing layer of a GdFeCo alloy, providing an auxiliary reproducing layer adjacent to the reproducing layer and formed of a TbFeCoAl alloy, forming said intermediate layer of a GdFeCo alloy, and forming said record hold layer of a TbFeCo allow.

24. A method of reproducing signals recorded on a magneto-optic recording medium formed of a multi-layer film comprising a reproducing layer, an auxiliary reproducing layer, an intermediate layer, and a record hold layer which are coupled magnetically, said record hold layer having information recorded therein comprising the steps of:
turning a direction of magnetization of the reproducing layer for initialization in a direction of an initializing magnetic field $H_{ini}$ meeting inequalities:

$$H_{ini} > (H_{C1}, H_{C2a})AVG + \sigma w2b/2(M_{S1} \cdot h_1 + M_{S2a} \cdot h_{2a}) = H_{C1} + H_{ini} > H_{C3} - \sigma w2b/2M_{S3} \cdot h_3$$

where:
$(H_{C1}, H_{C2a})_{AVG} = (M_{S1} \cdot h_1 \cdot H_{C1} + M_{S2a} \cdot h_{2a} \cdot H_{C2a})/(M_{S1} \cdot h_1 + M_{S2a} \cdot h_{2a})$ $H_{C1} < (H_{C1}, H_{C2a})_{AVG} < H_{C2a}$
$(H_{C1}, H_{C2a})_{AVG} > \sigma w2b/2(M_{S1} \cdot h_1 + M_{S2a} \cdot h_{2a})$ by applying the initializing magnetic field $H_{ini}$ to the magneto-optic recording medium on which said signals are recorded, and wherein $H_{C1}$ is the coercive force, $M_{S1}$ is the magnetization, and $H_1$ is the thickness of the reproducing layer, $H_{C2a}$ is the coercive force, $M_{S2a}$ is the magnetization, and $H_{2a}$ is the thickness of said auxiliary reproducing layer, $H_{C3}$ is the coercive force, $M_{S3}$ is the magnetization, and $h_3$ is the thickness of the record hold layer, and wherein $\sigma w_{2b}$ is an interfacial domain wall energy of the intermediate layer;

irradiating the reproducing layer with a spot of a laser beam to form a region heated to a temperature lower than a temperature $T_n$, a region heated to a temperature not lower than the temperature $T_n$ and lower than a temperature $T_n'$, and a region heated to a temperature not lower than the temperature $T_n'$ within the spot of the laser beam with application of a reproducing magnetic field $H_r$ to the magneto-optic recording medium; and reproducing the information recorded in the record hold layer through the reproducing layer in an optical signal by magneto-optic effect.

25. A magneto-optic recording/reproducing system, comprising:

a magneto-optic recording medium comprising a recording layer, a reproducing layer, and an intermediate layer formed between the recording layer and the reproducing layer;

means for irradiating the recording medium with a reading light beam to form within an area irradiated by the reading light beam at least a high-temperature region and a reproducing region heated to a temperature suitable for reproducing information and, said means for irradiating heating a portion of the intermediate layer in the high temperature region to a temperature not lower than a Curie temperature of the intermediate layer;

means for providing a reproducing magnetic field $H_r$ along the reading light beam at the area irradiated with the reading light beam, said magnetic field having a same direction as that of magnetization of the reproducing layer and it is not effected by magnetization of the recording layer; and at the reproducing region, the following expression being satisfied:

$$H_r + H_{CA} < H_{w1}$$

wherein $H_{CA}$ is a coercive force of the reproducing layer and $H_{w1}$ is a magnetic field created by a magnetic domain wall between the reproducing layer and the intermediate layer.

26. A magneto-optic recording/reproducing system according to claim 25, wherein a magnetic field for initializing the reproducing layer is not provided.

27. A magneto-optic recording/reproducing system according to claim 25, wherein an auxiliary reproducing layer is provided and wherein said reproducing layer and said auxiliary reproducing layer are formed of a magnetic materials that are rare earth metal-rich at room temperature.

28. A method of reproducing signals recorded on a magneto-optic recording medium having at least a reproducing layer, an auxiliary reproducing layer, and a recording layer, which are coupled magnetically, comprising the steps of:

turning a direction of magnetization of the reproducing layer in a direction for initialization by applying a first external magnetic field to the magneto-optic recording medium before reproducing recorded signals;

irradiating the reproducing layer with a laser beam to form a region III heated to a temperature lower than a temperature $T_a+$, a region II heated to a temperature not lower than the temperature $T_a+60$ and lower than the temperature $T_a$, and a region I heated to a temperature not lower than the temperature $T_a$ in an area in a spot of the laser beam, a second external magnetic field being applied to the magneto-optic recording medium, the reproducing layer maintaining the initialization in the region III, a magnetic coupling of the reproducing layer and the recording layer being cancelled and a direction of magnetization of the reproducing layer being turned in a direction of the second external magnetic field in the region I, and a direction of a moment of a transition metal of the reproducing layer being turned in a direction of a moment of a transition metal of the recording layer in the region II so that a signal recorded in the recording layer is transferred to the reproducing layer; and reading the signal from the reproducing layer by converting the signal into an optical signal by magneto-optic effect.

* * * * *